(12) United States Patent
Li

(10) Patent No.: US 8,477,408 B2
(45) Date of Patent: Jul. 2, 2013

(54) ELECTRONICALLY RECONFIGURABLE PLANAR CROSSBAR ARRAY OPTICAL ELEMENTS

(75) Inventor: Jingjing Li, Sunnyvale, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 751 days.

(21) Appl. No.: 12/384,259

(22) Filed: Apr. 2, 2009

(65) Prior Publication Data

US 2010/0253997 A1     Oct. 7, 2010

(51) Int. Cl.
    *G02F 1/29*     (2006.01)
(52) U.S. Cl.
    USPC .......................................................... 359/319
(58) Field of Classification Search
    USPC .......................................................... 359/319
    See application file for complete search history.

(56) References Cited

U.S. PATENT DOCUMENTS

| 6,962,844 B2 | 11/2005 | Stasiak |
| 8,149,485 B2 | 4/2012 | Li et al. |
| 2010/0165431 A1* | 7/2010 | Li et al. .......................... 359/32 |
| 2011/0273755 A1 | 11/2011 | Wang et al. |
| 2011/0273756 A1 | 11/2011 | Wang et al. |

OTHER PUBLICATIONS

United States Patent and Trademark Office, "Non-Final Office Action," issued in connection with U.S. Appl. No. 12/317,731, mailed on Aug. 23, 2011, 9 pages.
United States Patent and Trademark Office, "Notice of Allowance," issued in connection with U.S. Appl. No. 12/317,731, mailed on Jan. 24, 2012, 18 pages.
Seraphin et al. "Franz-Keldysh Effect of the Refractive Index in Semiconductors," Physical Review, vol. 139, No. 2A, Jul. 19, 1965, p. A560-A565.

* cited by examiner

*Primary Examiner* — James Jones

(57) ABSTRACT

Various embodiments of the present invention are directed to dynamically and electronically reconfigurable optical devices that can be operated as a lens or prism for incident beams of electromagnetic radiation. The optical devices include a phase-modulation layer (1501) disposed between first and second nanowire layers (1502,1503). Overlapping nanowires can be electronically addressed to implement a selected effective refractive index pattern of one or more regions (1510) of the phase-modulation layer, such that each region refracts a portion of an incident beam of electromagnetic radiation having a wavelength of interest in order to focus, diverge, or bend the incident beam.

15 Claims, 22 Drawing Sheets

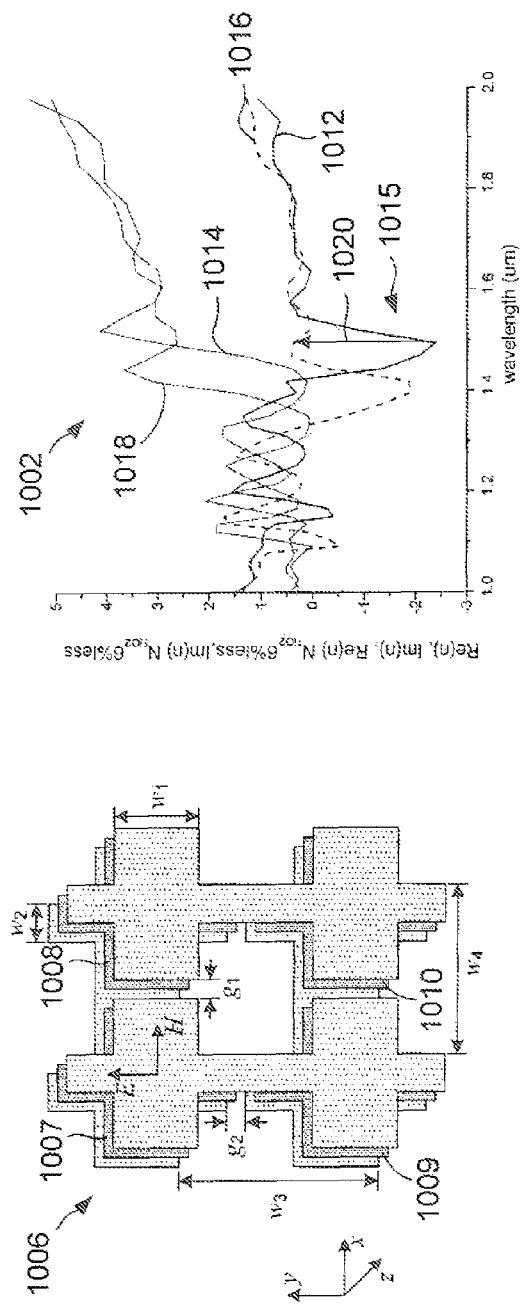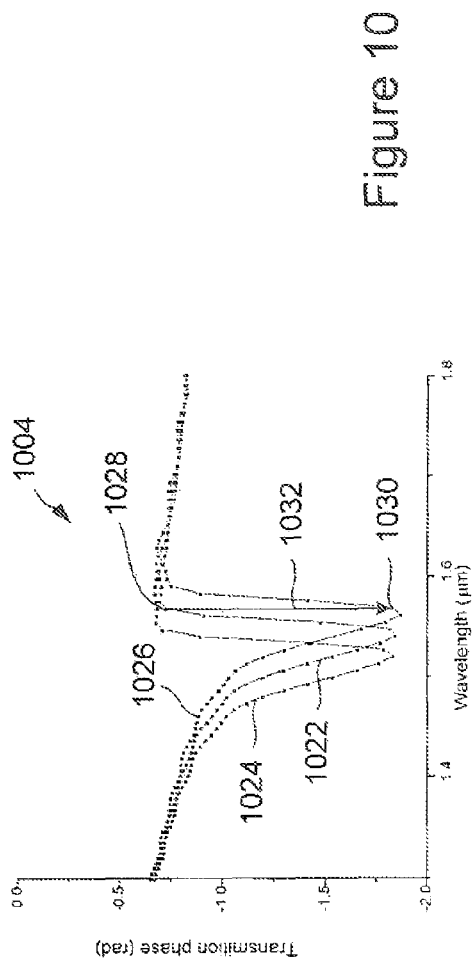
Figure 10

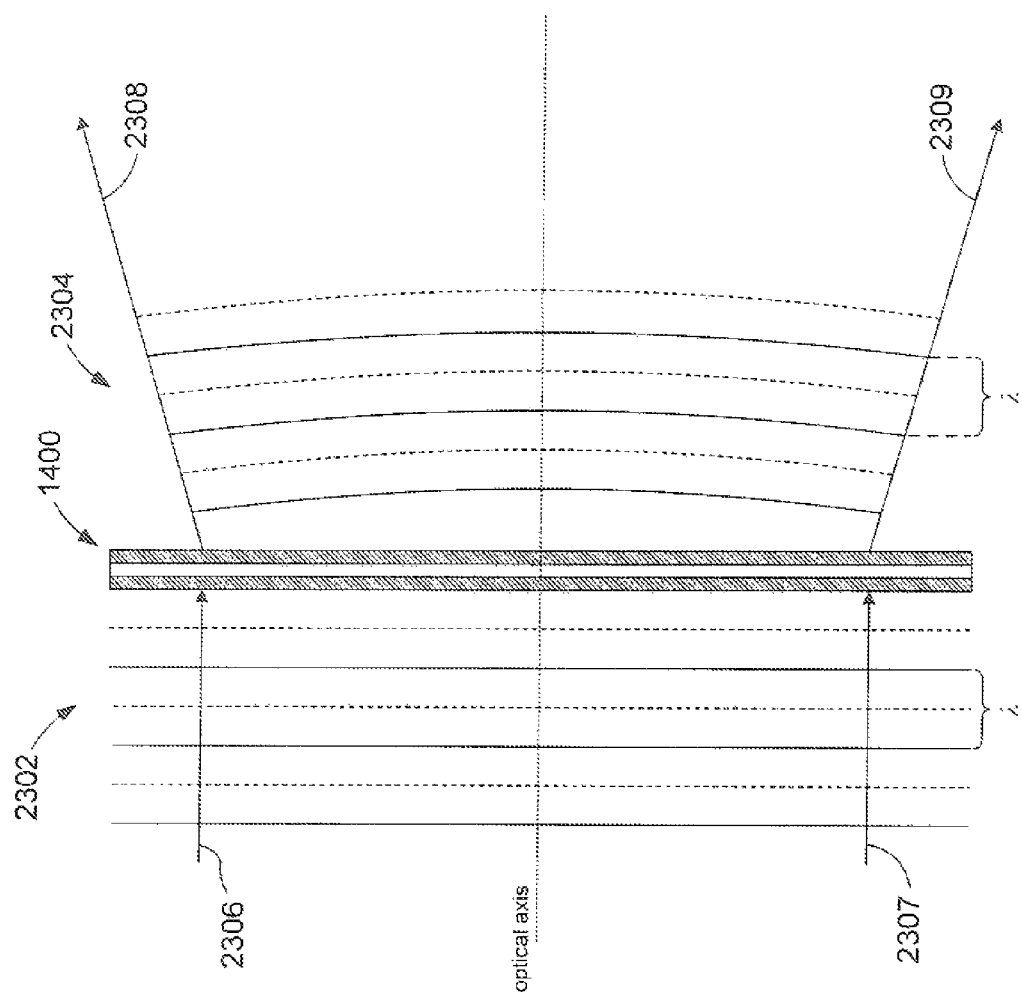

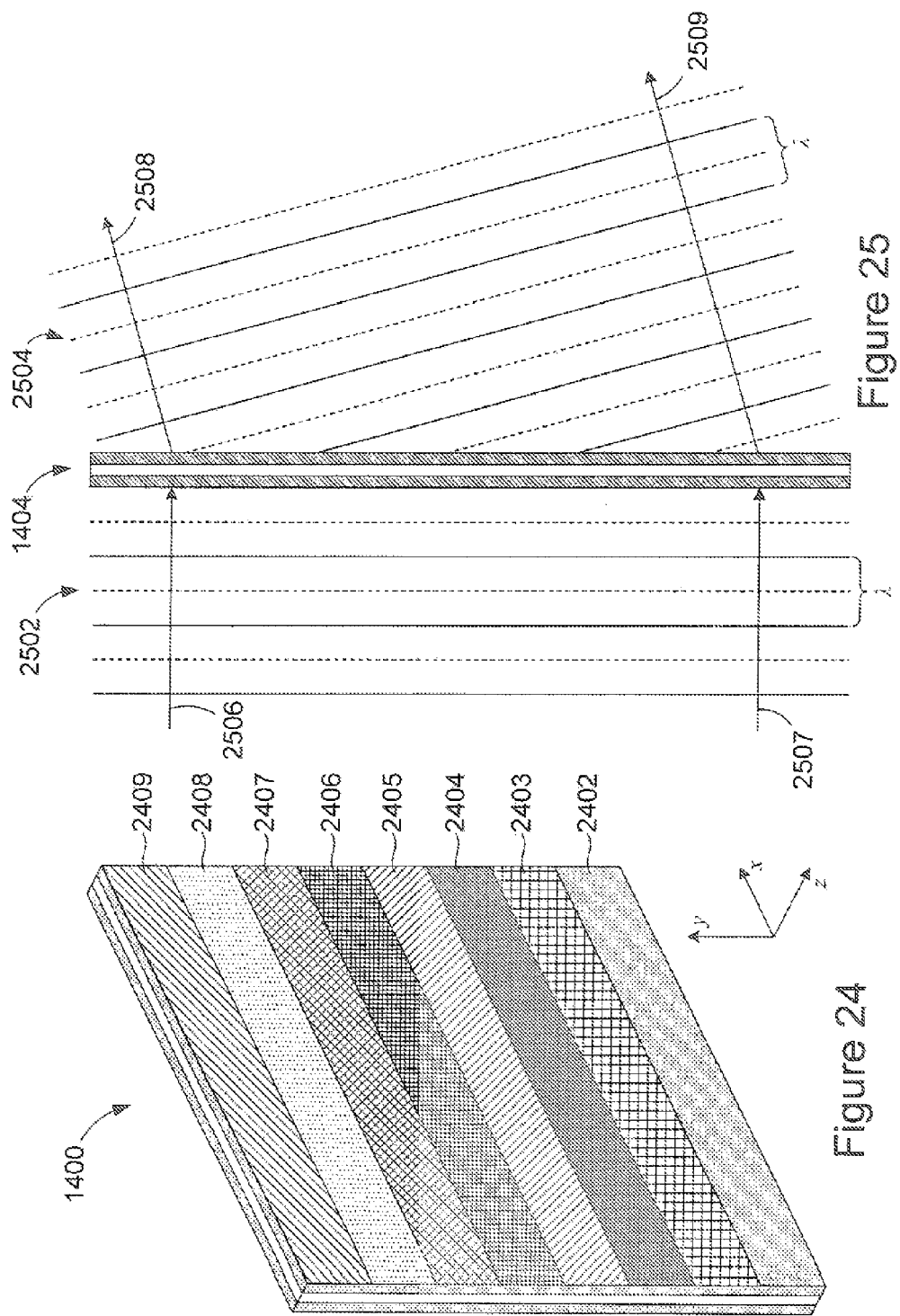

ELECTRONICALLY RECONFIGURABLE PLANAR CROSSBAR ARRAY OPTICAL ELEMENTS

STATEMENT OF GOVERNMENT INTEREST

This invention has been made with government support under Contract No. HR0011-05-3-0002, awarded by Defense Advanced Research Projects Agency. The government has certain rights in the invention.

TECHNICAL FIELD

Embodiments of the present invention relate to optical elements, and, in particular, to electronically reconfigurable planar crossbar arrays that can be operated as lenses and prisms.

BACKGROUND

Lenses and prisms are refracting optical elements configured to adjust the energy distribution of transmitted electromagnetic radiation. Most simple lenses are configured with two surfaces that correspond to surfaces of a sphere, where each surface can be manufactured as a convex surface (i.e., bulging outward from the lens), a concave surface (i.e., depressed into the lens), or a planar surface. For example, FIG. 1A shows side views of a biconvex lens 102, a biconcave lens 104, and plano-convex lens 106. The biconvex lens 102 comprises two opposing convex surfaces, the biconcave lens 104 comprises two opposing concave surfaces, and the plano-convex lens 106 comprises opposing convex and planar surfaces. As shown in FIG. 1B, a collimated beam of electromagnetic radiation 108 travelling parallel to the optical axis 110 and passing through the biconvex lens 102 converges or is said to be focused to a spot called the focal point 112 on the optical axis 110, at a certain distance behind the lens. This distance is called the focal length, and the lens 102 is also referred to as a positive or converging lens. On the other hand, FIG. 1C shows a collimated beam of electromagnetic radiation 114 passing through the biconcave lens 104. The beam after passing through the lens 104 diverges or spreads out and appears to be emanating from a point, also called a focal point 116, on the optical axis 118 in front of the lens 104. The distance from the point 116 to the center of the lens 104 is also known as the focal length, although it is negative with respect to the focal length of a convex lens.

Because simple lenses can be manufactured with various convex and concave curvatures, lenses are among the most widely and commonly used optical elements. For example, a simple lens can be configured as a corrective lens in eye glasses or a lens of a magnifying glass. On the other hand, a compound lens is an arrangement of simple lenses that share a common optical axis. The simple lenses of a compound lens can be configured and spaced along the optical axis to correct for optical aberrations and to magnify images of small or distant objects in devices such as microscopes, camera lenses, and telescopes in ways that are not possible using only a simple lens.

A prism, on the other hand, is a transparent optical element with flat, polished surfaces that refract transmitted electromagnetic radiation. The exact angles between the surfaces depend on the application and the desired degree to which the transmitted electromagnetic radiation is bent. Prisms can be manufactured with traditional geometrical shapes, such as a triangular prism with a triangular base and top and rectangular sides.

Manufactured optical elements are typically composed of glass or a transparent plastic and may be cut, ground, and polished after manufacturing to change the optical properties, such as changing the optical axis, focal point, focal length, degree of refraction, or whether the lens is convergent or divergent. For example, a lens can be cut, ground, and polished after manufacturing to change the focal length or to reposition the optical axis to no longer pass through the physical center of the lens. However, changing the optical properties of an optical element is typically a labor intensive process that fixes the optical properties of the optical element. After the optical properties of a manufactured lens have been changed via cutting and grinding, it may be too labor intensive or impossible to restore the lens to its original manufactured optical properties. For example, it may be impossible to reconfigure a biconvex lens as a prism or as a biconcave lens via cutting and grinding.

Thus, it is desirable to have optical devices that can be operated as reconfigurable optical elements.

BRIEF DESCRIPTION OF THE DRAWINGS

FIG. 10 shows a plot of the refractive index and phase changes for an exemplary negative index material crossbar configured and operated in accordance with embodiments of the present invention.

FIG. 23 shows a side view of an optical device operated as a diverging lens in accordance with embodiments of the present invention.

FIG. 24 shows a schematic representation of an optical device operated as a prism in accordance with embodiments of the present invention.

FIG. 25 shows a side view of an optical device operated as a prism in accordance with embodiments of the present invention.

DETAILED DESCRIPTION

Figure 1A:
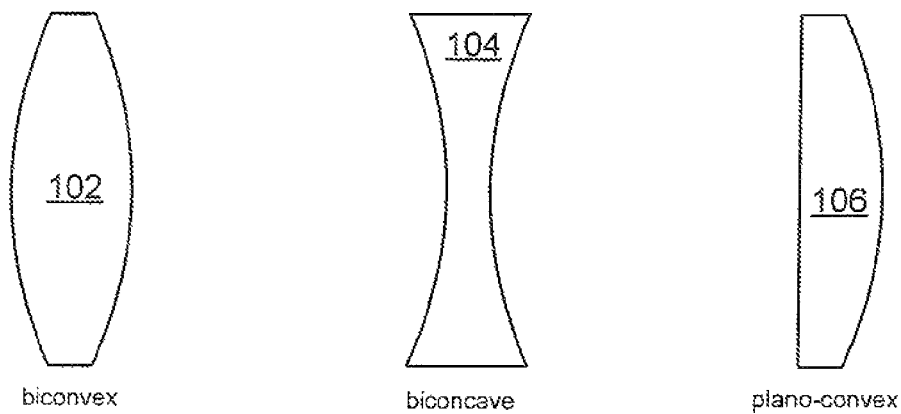
FIG. 1A shows side views of three simple lenses.
Figure 1B:
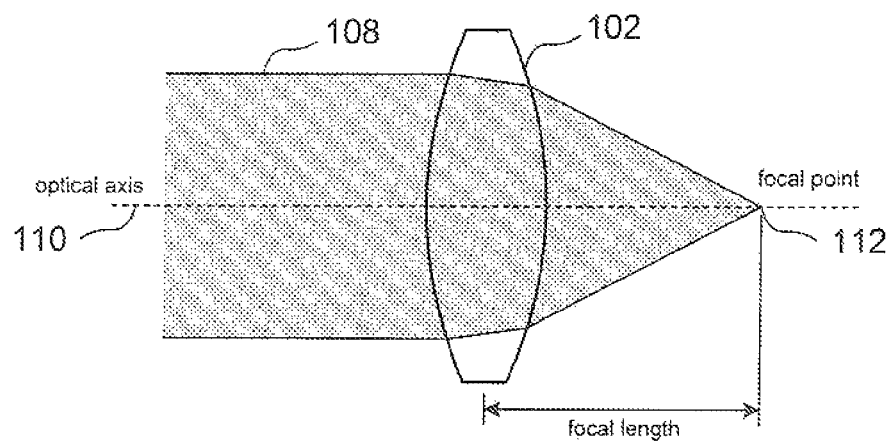
FIGS. 1B-1C show optical properties of a biconvex lens and a biconcave lens, respectively.
Figure 1C:
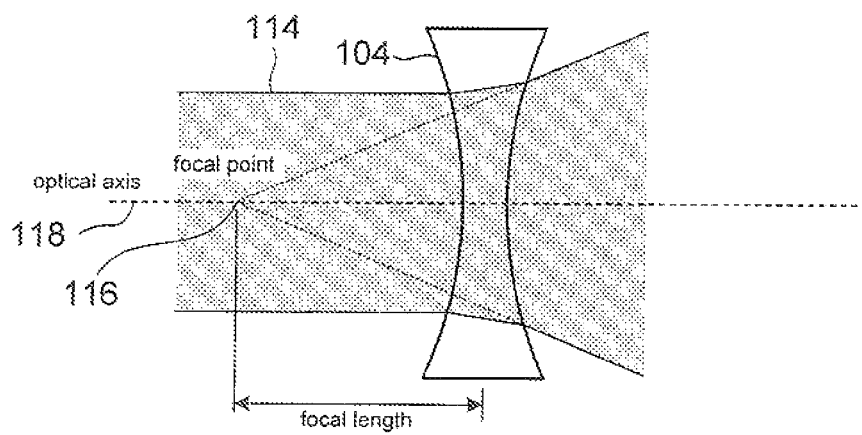

Various embodiments of the present invention are directed to optical devices that can be operated as reconfigurable optical elements, such as lenses and prisms. The term "optical" refers to a device that operates in the visible and the non-visible portions of the spectrum of electromagnetic radiation. The optical devices include a phase-control layer disposed between two overlapping nanowire layers of a crossbar array enabling the effective refractive index of regions of the crossbar array to be electrically controlled. Electromagnetic radiation transmitted through an optical device is refracted by changing the refractive index of the phase-control layer, which causes phase changes in portions of the transmitted electromagnetic radiation.

A crossbar array device configured in accordance with embodiments of the present invention has a planar geometry, operates as a negative index material over certain portions of the electromagnetic spectrum, and can be operated as a lens or as a prism. In other words, an incident beam of electromagnetic radiation can be focused, diverged, or redirected even though the device has a planar geometry. In addition, the electronic re-configurability of the device enables the same device to be switched from operating as a focusing lens to operating as a diverging lens or to operating as a prism. The focal length associated with either focusing or diverging and the degree to which an incident beam can be refracted is also electronically adjustable, programmable, and can be changed without having to reposition the optical device. Optical devices configured and operated in accordance with embodiments of the present invention can replace common simple and compound lenses and can also be operated to define the shape of a laser beam. For example, the Gaussian shape of a laser beam can be sharpened by passing the beam through an appropriately operated optical device.

Negative Index Materials

Negative index materials ("NIMs"), also called metamaterials, are materials with optical properties resulting from the structure of the material rather than from the chemical composition of the material. Natural materials have positive permeability, $\mu$, and may have positive or negative dielectric permittivity $\in$, depending on the type of conductivity of the material and frequency ranges. In contrast, NIMs have simultaneously negative $\in$ and $\mu$ for certain portions of the electromagnetic spectrum, which results in optical properties that are different from those of ordinary composite materials. The optical properties of NIMs can be appreciated by comparing and contrasting the optical properties of NIMs with the optical properties of ordinary composite materials, as described in *Electrodynamics of Metamaterials*, by A. K. Sarychev and V. M. Shalaev (World Scientific, New York, 2007). For example, consider Maxwell's first-order differential equations for an electromagnetic wave propagating in an ordinary composite material with a time harmonic field as follows:

$$\nabla \times \vec{E} = -j\omega\mu\vec{H}$$

$$\nabla \times \vec{H} = j\omega \in \vec{E}$$

where $\vec{E}$ is the electric field component, $\vec{H}$ is the magnetic field component, $j=\sqrt{-1}$, and $\omega$ is the angular frequency. The solutions of these equations are the plane-wave fields:

$$\vec{E} = \vec{E}_0 \exp(-j\vec{k}_o \cdot \vec{r})$$

$$\vec{H} = \vec{H}_0 \exp(-j\vec{k}_o \cdot \vec{r})$$

Figure 2A:
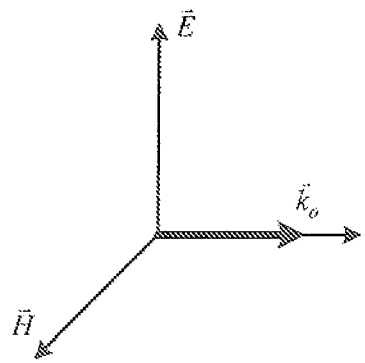
FIGS. 2A-2B show wave and Poynting vector directions for electromagnetic waves propagating in an ordinary right-handed medium.

Substituting the plane-wave equations into Maxwell's first order differential equations gives the relations:

$$\vec{k}_o \times \vec{E} = \omega\mu\vec{H}$$

$$\vec{k}_o \times \vec{H} = -\omega \in \vec{E}$$

where $\vec{k}_o$ is a wavevector indicating the direction an electromagnetic wave propagates within a composite material. FIG. 2A shows the spatial relationship and relative orientation of the vectors $\vec{E}$, $\vec{H}$, and $\vec{k}_o$ and reveals that for an ordinary composite material with positive $\in$ and $\mu$, the vectors $\vec{E}$, $\vec{H}$, and $\vec{k}_o$ form an orthogonal, right-handed system of vectors.

Figure 2B:
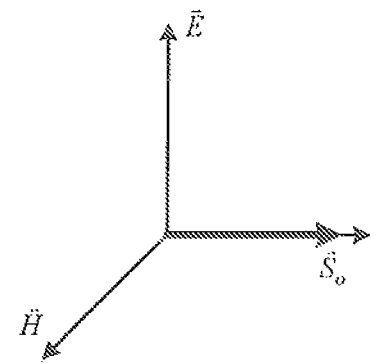

In addition, the direction of the time-averaged energy flux of the electromagnetic wave is given by the real component of the Poynting vector:

$$\vec{S}_o = \frac{1}{2}\text{Re}(\vec{E} \times \vec{H}^*)$$

which, as shown in FIG. 2B, reveals that the vectors $\vec{E}$, $\vec{H}$, and $\vec{S}_o$ also form an orthogonal, right-handed vector system. In other words, FIGS. 2A and 2B, show that for an electromagnetic wave propagating through a ordinary composite material, the propagation direction identified by the wavevector $\vec{k}_o$ and the direction of the energy carried by the electromagnetic wave identified by the Poynting vector $\vec{S}_o$ are the same.

Figure 3A:
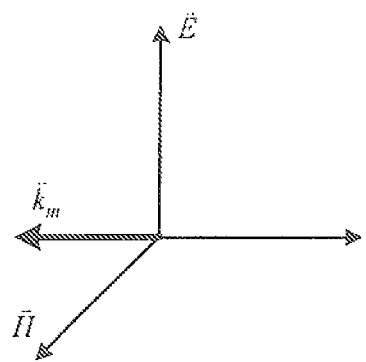
FIGS. 3A-3B show wave and Poynting vector directions for electromagnetic waves propagating in a negative index metamaterial.
Figure 3B:
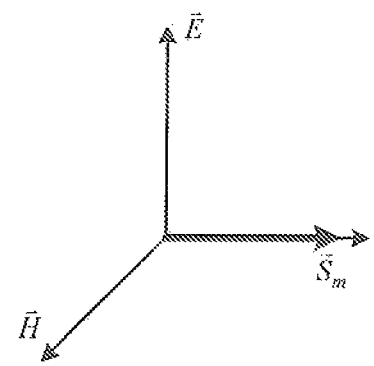

On the other hand, consider NIMs, where $\in < 0$ and $\mu < 0$. Maxwell's first order differential equations give the relations:

$$\vec{k}_m \times \vec{E} = -\omega|\mu|\vec{H}$$

$$\vec{k}_m \times \vec{H} = \omega|\in|\vec{E}$$

where $\vec{k}_m$ is a wavevector indicating the direction the phase the electromagnetic wave propagates in a NIM. As shown in FIG. 3A, and in contrast to the composite materials shown in FIG. 2A, for NIMs, the vectors $\vec{E}$, $\vec{H}$, and $\vec{k}_m$ form an orthogonal, left-handed system of vectors. In other words, comparing the directions of the wavefronts represented by the wavevectors $\vec{k}_c$ and $\vec{k}_m$ shown in FIGS. 2A and 3A, respectively, reveals that electromagnetic waves propagate backwards in NIMs for the same orientation of the vectors $\vec{E}$ and $\vec{H}$. Thus, NIMs are also referred to as "left-handed media" or "backward media." However, as shown in FIG. 3B, the Poynting vector $\vec{S}_m$ in a metamaterial is unaffected by the change of sign of $\in$ and $\mu$, and the vectors $\vec{E}$, $\vec{H}$, and $\vec{S}_m$ still form an orthogonal, right-handed system of vectors in a left-handed medium. Therefore, in NIMs, energy and wavefronts travel in opposite directions.

Now consider the refraction of an incident ray at the interface between ordinary and left-handed media. Based on the properties of electromagnetic waves travelling in NIMs described above, it follows that, unlike refraction observed in ordinary media, the angles-of-incidence and refraction have opposite signs. Snell's law in NIMs becomes:

$$\frac{\sin\theta_1}{\sin\theta_2} = \frac{-|k_2|}{|k_1|} \equiv \frac{n_2}{n_1} < 0,$$

where the subscripts 1 and 2 identify ordinary and left-handed media, respectively. Assuming $n_1 > 0$, from Snell's law it follows that $n_2 < 0$. That is, the sign of the square root in the definition of the refractive index is chosen to be negative:

$$n_2 = -\sqrt{\in \mu} < 0$$

Hence the term "negative index material" is used to refer to materials having both negative $\in$ and $\mu$.

Figure 4:
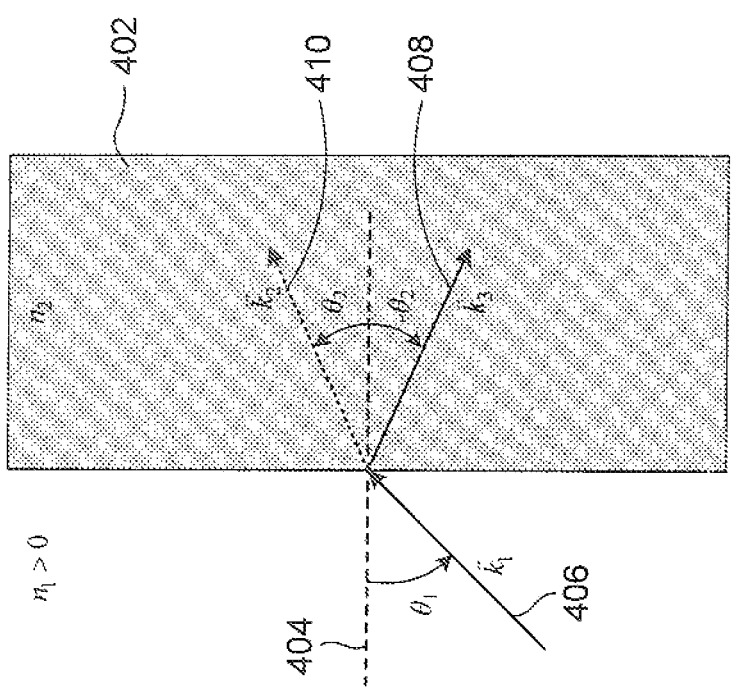
FIG. 4 shows refraction of rays of electromagnetic radiation in an ordinary right-handed medium and a negative index metamaterial.

FIG. 4 shows refraction of rays of electromagnetic radiation in an ordinary right-handed medium and a negative index metamaterial. Dashed line 404 represents a surface normal extending perpendicular to the surface of a medium 402. As shown in FIG. 4, angle $\theta_1$ and wavevector $\vec{k}_1$ 406 represent the angle-of-incidence and direction of a ray of electromagnetic radiation propagating through an ordinary medium with index of refraction $n_1 > 0$ and is incident on the medium 402. Angle $-\theta_2$ and wavevector $\vec{k}_3$ 408 represent the angle-of-refraction and direction of a refracted ray of electromagnetic radiation propagating within the medium 402 with refractive index $n_2 < 0$, while angle $\theta_2$ and wavevector $\vec{k}_2$ 410 represent the angle-of-refraction and direction of a refracted ray of electromagnetic radiation propagating within the medium 402 with refractive index $n_2 > 0$, where $|n_2| > n_1$. Thus, for the medium 402 with a refractive index of $n_2 < 0$, the incident ray 406 and the refracted ray 408 lie on the same side of the surface normal 404, and for the medium 402 with a refractive index of $n_2 > 0$, the incident ray 406 and the refracted ray 410 lie on opposite sides of the surface normal 404.

Figure 5:
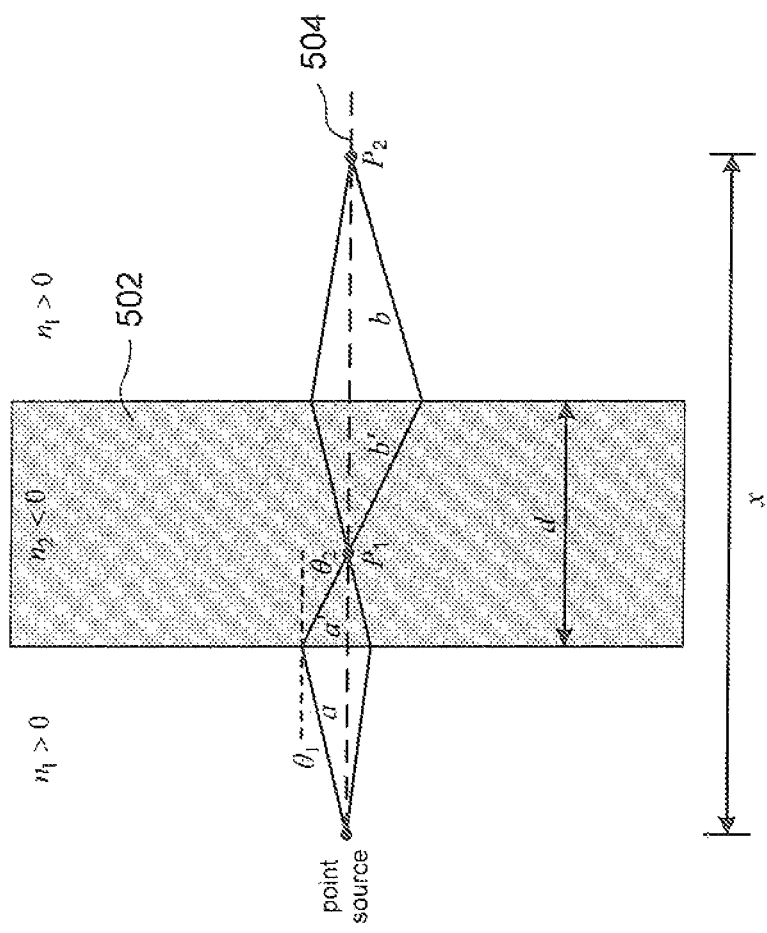
FIG. 5 shows focusing properties of a metamaterial slab for electromagnetic radiation emanating from a point source.

Tracing the paths of optical rays through conventional concave and convex lens made of left-handed media reveals that concave lenses become convergent and convex lens become divergent, thus reversing the behavior of lenses comprising ordinary media. FIG. 5 shows focusing properties of a slab 502 composed of a NIM for electromagnetic radiation emanating from a point source. For incident rays paraxial to an optical axis 504, Snell's law gives:

$$|n| = \frac{|n_2|}{n_1} = \frac{|\sin\theta_1|}{|\sin\theta_2|} \square \frac{|\tan\theta_1|}{|\tan\theta_2|} = \frac{a'}{a} = \frac{b'}{b}$$

where n is the refractive index $n_2$ of the slab 502 relative to refractive index of the surrounding medium $n_1$. As shown in FIG. 5, rays emanating from the point source are focused at two points $P_1$ and $P_2$. Point $P_1$ lies inside the slab 502 and point $P_2$ lies on the side of the slab 502 opposite the point source. The distance from the point source to the second focusing point $P_2$ is given by:

$$x = a + a' + b' + b = d + \frac{d}{|n|}$$

where d is the width of the slab. When n equals $-1$, the focusing effect is not restricted to paraxial rays, because in this case $|\theta_1|$ equals $|\theta_2|$ for any angle-of-incidence. In fact, when n equals $-1$, all rays emanating from the point source are focused at two points, the latter point $P_2$ being at a distance 2d from the point source. Thus, unlike slabs comprising ordinary composite materials, slabs composed of NIMs can be configured to focus electromagnetic radiation.

Negative Index Material Crossbars

Figure 6:
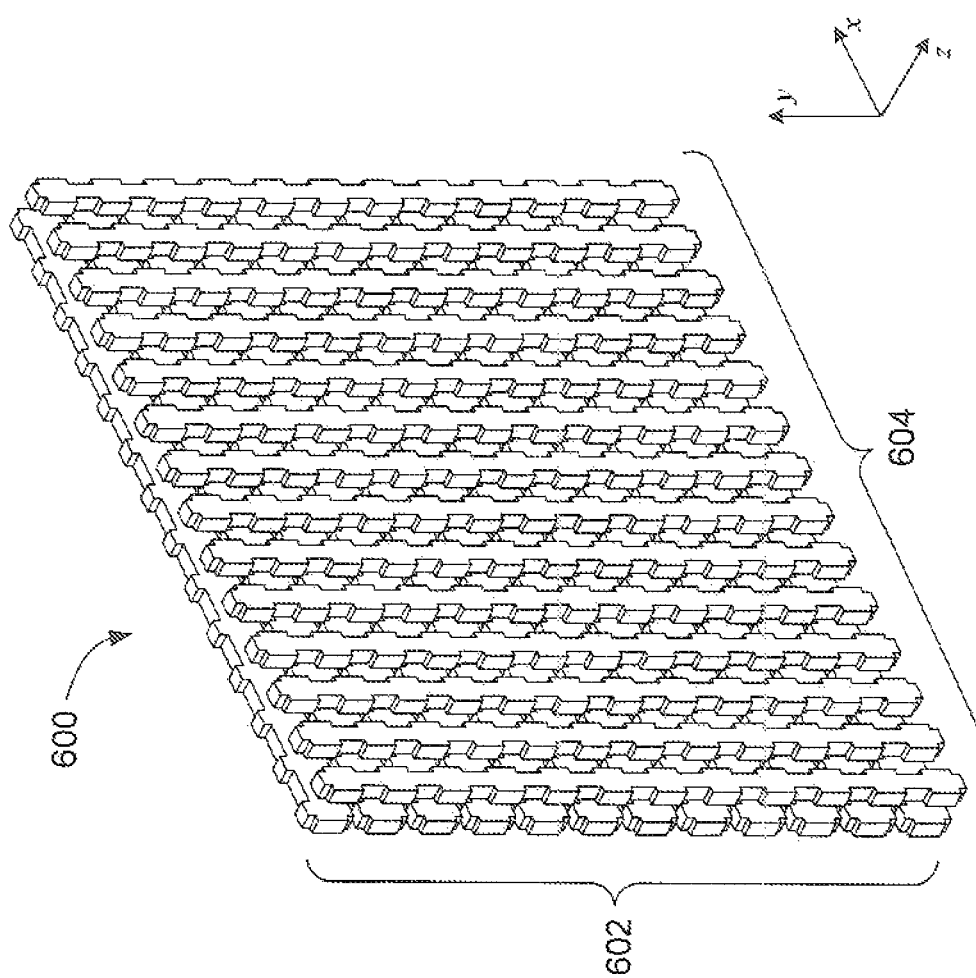
FIG. 6 shows an isometric view of a negative index material crossbar configured in accordance with embodiments of the present invention.

FIG. 6 shows an isometric view of a NIM crossbar 600 configured in accordance with embodiments of the present invention. The NIM crossbar 600 comprises a first layer of approximately parallel nanowires 602 that are overlain by a second layer of approximately parallel nanowires 604. The nanowires of the first layer 602 run substantially parallel to the x-axis and are approximately perpendicular, in orientation, to the nanowires of the second layer 604, which run substantially parallel to the y-axis, although the orientation angle between the nanowires of the layers 602 and 604 may vary. The two layers of nanowires form a lattice, or crossbar, with each nanowire of the second layer 604 overlying all of the nanowires of the first layer 602 and coming into close contact with each nanowire of the first layer 602 at nanowire intersections called "resonant elements" that represent the closest contact between two nanowires.

Figure 7:
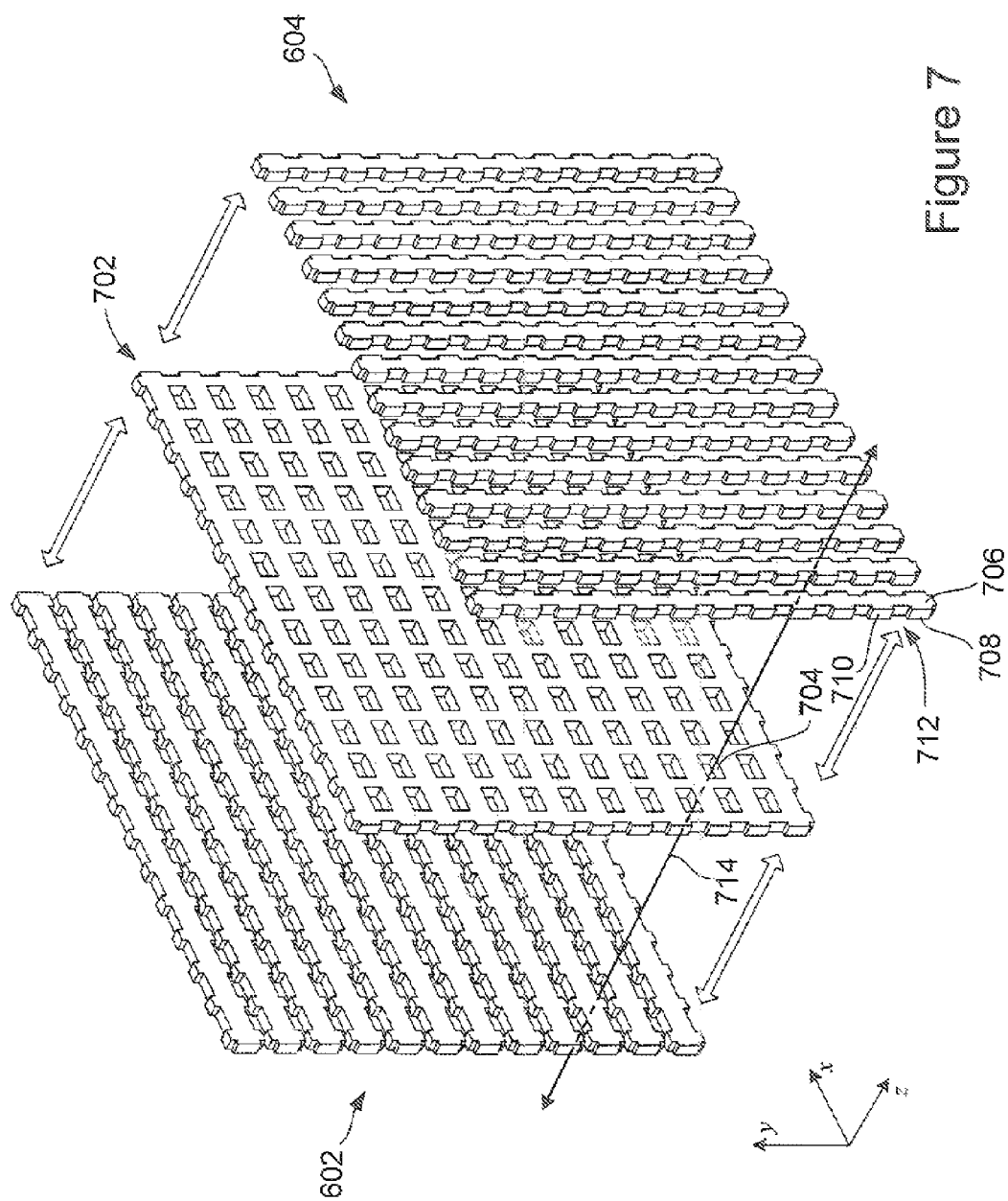
FIG. 7 shows an exploded isometric view of the negative index material crossbar configured in accordance with embodiments of the present invention.

FIG. 7 shows an exploded isometric view of the NIM crossbar 600 configured in accordance with embodiments of the present invention. FIG. 7 reveals an intermediate layer 702 sandwiched between the first layer of nanowires 602 and the second layer of nanowires 604. The intermediate layer 702 is a continuous layer including an array of regularly spaced holes, such as hole 704. In certain embodiments, as shown in FIG. 7, the holes can be rectangular, and in other embodiments, the holes can be square. The nanowires in the first layer 602 have relatively larger cross-sectional dimensions than the nanowires comprising the second layer 604. FIG. 7 also reveals that the nanowires in both the first and second layers 602 and 604 are configured with substantially regularly spaced protuberances called "fingers" that are separated by notches. For example, nanowire 706 includes fingers 708 and 710 separated by a notch 712. The fingers of nanowires of one layer are approximately parallel to the length of the nanowires in the other layer, and the fingers of adjacent nanowires within the same layer are also substantially aligned within the first and second layers 602 and 604, and the holes in the intermediate layer 702 are substantially aligned with the notches between fingers in the first and second layers 602 and 604. For example, line 714 passes through notches of adjacent nanowires in the first layer 602 passes through the hole 704 in the intermediate layer 702 and passes through notches in adjacent nanowires in the second layer 604.

Figure 8:
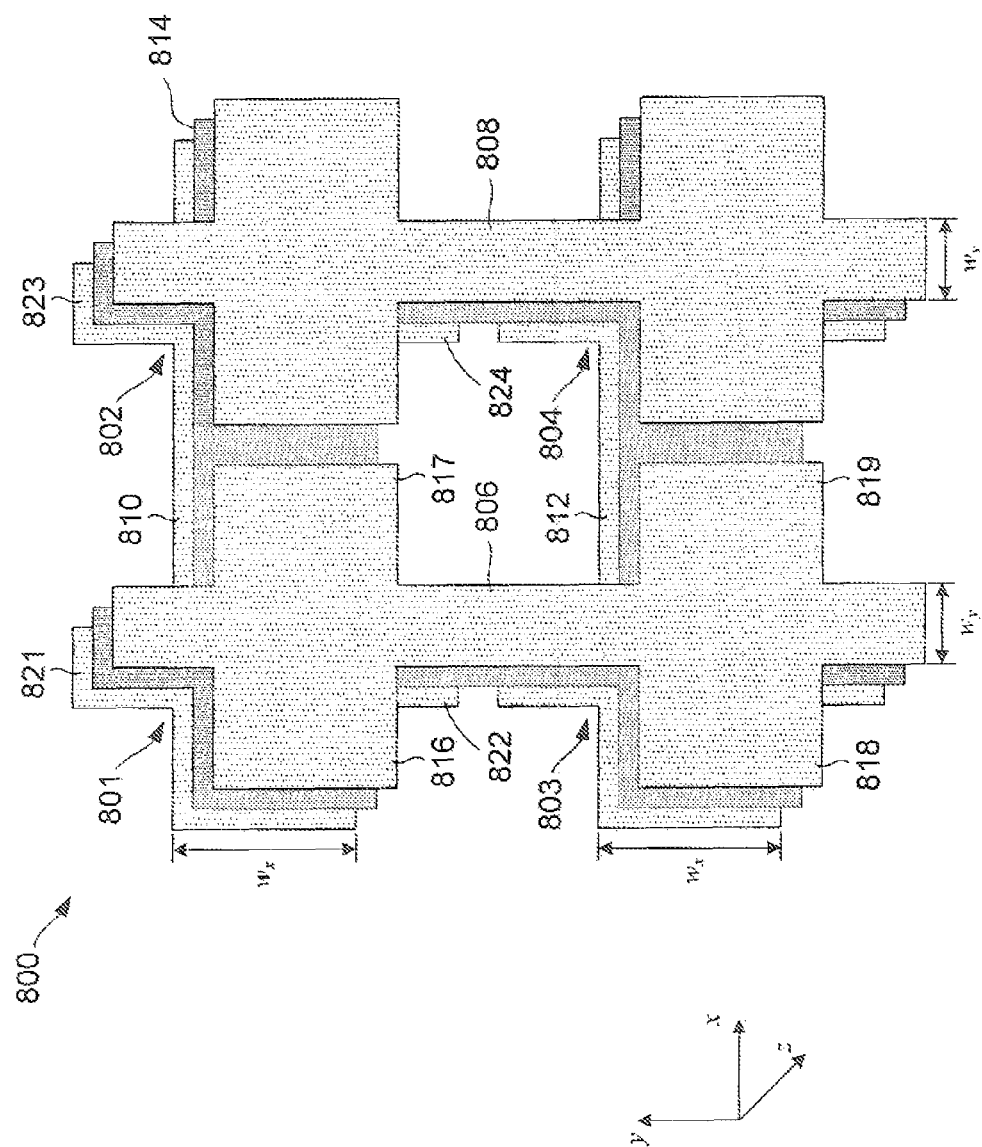
FIG. 8 shows an isometric view of an enlargement of a four adjacent resonant elements of the negative index material crossbar configured in accordance with embodiments of the present invention.

FIG. 8 shows an isometric view of an enlargement 800 of a four adjacent resonant elements 801-804 of the NIM crossbar 600 configured in accordance with embodiments of the present invention. The resonant elements 801-804 are formed by nanowires 806 and 808 extending in the y-direction overlaying portions of nanowires 810 and 812 extending in the x-direction. The nanowires 806 and 808 are separated from the nanowires 810 and 812 by a portion 814 of intermediate layer 702. The width $w_x$ of the nanowires 810 and 812 in the first layer 602 is larger than the width $w_y$ of the nanowires 806 and 808 in the second layer 604. The nanowires 806 and 808 include fingers protruding in the x-direction, such as fingers 816-819 of nanowire 806, and nanowires 810 and 812 include fingers protruding in the y-direction, such as fingers 821-824 of nanowire 810. The fingers of adjacent nanowires lying in the same layer are separated by gaps. As shown in FIG. 8, each of the resonant elements 801-804 includes two fingers of a nanowire in the first layer 602 and two fingers of a nanowire in the second layer 604. For example, resonant element 801 includes fingers 816 and 817 of nanowire 806 and fingers 821 and 822 of nanowire 810.

Figure 9:
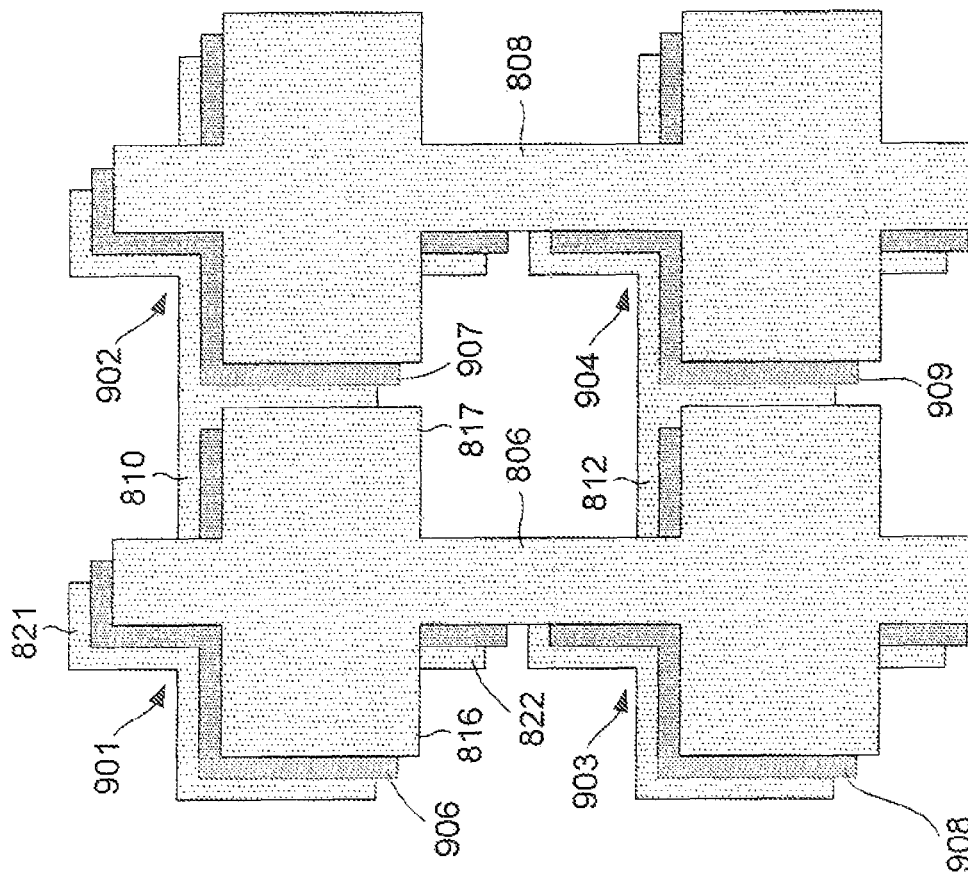
FIG. 9 shows an isometric view of an enlargement of four adjacent resonant elements of a negative index material crossbar configured in accordance with embodiments of the present invention.

In other embodiments, the intermediate layer 702 may be composed of discrete portions of a material lying within each resonant element. FIG. 9 shows an isometric view of an enlargement 900 of four adjacent resonant elements 901-904 of a NIM crossbar configured in accordance with embodiments of the present invention. The resonant elements 901-904 include intermediate plus-shaped layers 906-909, respectively, disposed within the region between the fingers of nanowires 806 and 808 overlaying nanowires 810 and 812. As shown in FIG. 9, adjacent plus-shaped layers 906-909 are separated by gaps, and each plus-shaped layer fills the space between the nanowire of one layer and the fingers of a nanowire in another layer. For example, plus-shaped layer 906 is configured to fill the space between fingers 821 and 822 and nanowire 806 and fill the space between fingers 816 and 817 and nanowire 810.

Although individual nanowires shown in FIG. 6-9 have rectangular cross sections, nanowires can also have square, circular, elliptical, or more complex cross sections dictated by design of supporting a magneto-plasmon resonance and related NIM behavior over a particular wavelength or frequency range of interest of the electromagnetic spectrum. The nanowires may be configured to have many different widths or diameters and aspect ratios or eccentricities ranging from approximately ⅕ to approximately 1/20 of the wavelength of incident electromagnetic radiation or ranging from approximately 20 nm to approximately 200 nm. Although the fingers shown in FIGS. 6-9 have clearly defined edges, in other embodiments, the fingers may have rounded edges. The term "resonant element" may refer to crossbars having one or more layers of sub-microscale wires, microscale wires, or wires with larger cross-sectional dimensions, in addition to nanowires. The nanowires can be comprised of silver ("Ag"), gold ("Au"), copper ("Cu"), aluminum ("Al"), platinum ("Pt"), or another suitable electronically conducting metal, or the nanowires can be composed of heavily doped semiconductors depending on the frequency of incident electromagnetic radiation.

The crossbar layers can be fabricated by mechanical nanoimprinting techniques. Alternatively, nanowires can be chemically synthesized and can be deposited as layers of approximately parallel nanowires in one or more processing steps, including Langmuir-Blodgett processes with subsequent patterning. Other alternative techniques for fabricating nanowires may also be employed. Thus, a two-layer nanowire crossbar comprising first and second layers of nanowires, as shown in FIGS. 6-9, can be manufactured by any of numerous relatively straightforward processes. Many different types of conductive and semi-conductive nanowires can be chemically synthesized from metallic and semiconductor substances, from combinations of these types of substances, and from other types of substances. A nanowire crossbar may be connected to microscale address-wire leads or other electronic leads, through a variety of different methods in order to electronically couple the nanowires to electronic devices.

The resonant elements can be configured with dimensions that are smaller than the wavelength λ of electromagnetic radiation incident on the crossbar 600 enabling the crossbar 600 to be operated as a NIM over particular wavelength ranges of interest. In particular, the size and shape of the fingers can be selected to have an appropriate inductance, resistance, and capacitance response to a wavelength of interest. In addition, because each resonant element can be separately addressed by biasing the pair of nanowires crossing at the selected resonant element, the refractive index of the intermediate layer of each resonant element can be adjusted by applying appropriate electronic signals, such as voltages or currents, to the nanowires. The size and shape of the fingers and control over the refractive index of the intermediate layer of the resonant elements enables the crossbar 600 to be configured and operated as a NIM over particular wavelength ranges of interest and shift the transmission phase of electromagnetic radiation transmitted through the crossbar 600.

FIG. 10 shows a plot of the refractive index 1002 and phase changes 1004 for an exemplary NIM crossbar configured and operated in accordance with embodiments of the present invention. Plots 1002 and 1004 were obtained using the well-known finite-difference time-domain method ("FDTD") described in *Computational Electrodynamics: The Finite-Difference Time-Domain Method*, Third Edition, by Allen Taflove and Susan C. Hagness, Artech House Publishers (Jun. 30, 2005). FIG. 10 also includes a crossbar 1006 representing four adjacent resonant elements with parameters identifying the dimensions of the nanowires, fingers, and spacing between resonant elements used to obtain the results displayed in plots 1002 and 1004. The dimensions of the parameters are provided in Table I as follows:

TABLE I

| Parameter | Dimension |
|---|---|
| $w_1$ | 225 nm |
| $w_2$ | 90 nm |
| $w_3$ | 450 nm |
| $w_4$ | 450 nm |
| $g_1$ | 45 nm |
| $g_2$ | 45 nm |

The nanowires are composed of Ag, and the plus-shaped intermediate layers 1007-1010 are composed of $TiO_2$ with a thickness of 60 nm.

For electromagnetic radiation polarized in the y-direction and incident on the crossbar 1006 in the z-direction, curves 1012 and 1014 of plot 1002 represent the real and imaginary refractive index components, respectively, over a range of wavelengths with no electronic signal applied to resonant elements of the crossbar 1006. A portion 1015 of the real component 1012 indicates that the crossbar 1006 exhibits a negative refractive index for incident electromagnetic radiation with wavelengths ranging from approximately 1.42 µm to approximately 1.55 µm with the largest negative refractive index occurring for incident electromagnetic radiation with wavelengths of approximately 1.5 µm. Curves 1016 and 1018 of plot 1002 represent the real and imaginary refractive index components with a 6% change in the refractive index when appropriate electronic signals are applied to the nanowires of the crossbar 1006. Curve 1016 exhibits a real negative refractive index shift for incident electromagnetic radiation with wavelengths ranging from approximately 1.32 µm to approximately 1.46 µm with the largest negative refractive index occurring for incident electromagnetic radiation with wavelengths of approximately 1.4 µm. In other words, the crossbar 1006 can be operated to change the refractive index that incident electromagnetic radiation encounters over particular wavelength ranges. For example, incident electromagnetic radiation with a wavelength of interest, such as a wavelength of approximately 1.5 µm, encounters the strongest real negative refractive index component when no electronic signal is applied to the crossbar 1006. However, when appropriate electronic signals are applied to the nanowires, the refractive index encountered by the wavelength of interest is shifted to a positive relatively smaller in magnitude refractive index, as indicated by directional arrow 1020.

A change in the refractive index encountered by the wavelength of interest shifts the transmission phase of the wavelength of interest. Curves 1022-1024 of plot 1004 represent the transmission phase of electromagnetic radiation over a range of wavelengths passing through the crossbar 1006 for three different refractive indices. Curve 1022 represents the transmission phase acquired by electromagnetic radiation over a range of wavelengths passing through the crossbar 1006 when no electronic signal is applied to the crossbar 1006. Curve 1024 represents the transmission phase acquired by electromagnetic radiation over a range of wavelengths passing through the crossbar 1006 when electronic signals applied to the nanowires of the crossbar 1006 increase the refractive index of the intermediate layers 1007-1010 by 3%. Curve 1026 represents the transmission phase acquired by electromagnetic radiation over a range of wavelengths passing through the crossbar 1006 when electronic signals applied to the nanowires of the crossbar 1006 decrease the refractive index of the intermediate layers 1007-1010 by 3%. The crossbar 1006 can be operated to shift the phase acquired by a wavelength of interest. The transmission phase is the phase acquired by electromagnetic radiation transmitted through the crossbar 1006. For example, when no electronic signal is applied to the crossbar 1006, point 1028 indicates that electromagnetic radiation with the wavelength interest, approximately 1.58 µm, transmitted through the crossbar 1006 acquires a transmission phase of approximately −0.7 radians. On the other hand, when electronic signals corresponding to the curve 1026 are applied to the crossbar 1006, the wavelength of interest acquires a transmission phase of approximately −1.78 radians, which is a transmission phase shift of approximately −1.2 radians from the point 1028 to the point 1030, as indicated by directional arrow 1032.

Resonant Elements

The refractive index of the materials selected for the intermediate layer of the resonant elements can vary according to the particular molecular configuration or electronic states of the material. The materials selected for the resonant elements exhibit an appreciable refractive index change in response to externally applied electric fields, which can be used to control the resonant behavior of the phase shift, as described above with reference to FIG. 10. In certain embodiments, the material may transition reversibly from one state to another and back, so that the resonant elements may be reconfigured, or programmed, by application of differential current levels or voltages, called electronic signals, to selected resonant elements. The molecules comprising the intermediate layers of the resonant elements may have various different states in which the molecules exhibit resistive, semiconductor-like, or conductive electrical properties. The states and relative energies of the states of the intermediate layer materials may be controlled by applying differential current levels or voltages to the overlapping nanowires forming the resonant element. For example, in certain embodiments, certain states of the intermediate layer materials can be set by applying electronic signals to nanowires of a resonant element. In certain embodiments, the applied electronic signals can change the oxidation or redox state of the intermediate layer material which induces a change in the refractive index of the resonant element. Additional circuit elements such as diodes, transistors, memristors, capacitors, and resistors for optimal performance can be formed at resonant elements or a part of the nanowire crossbar. A nanowire crossbar can also be integrated with CMOS circuits.

Figure 11:
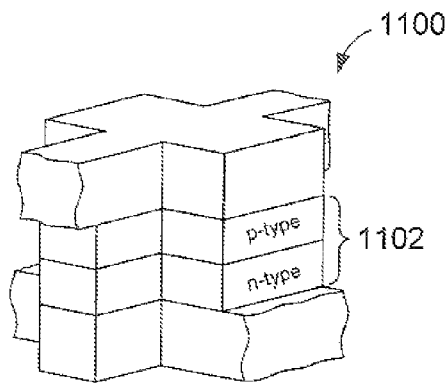
FIG. 11 shows an isometric view a resonant element configured with a p-n junction intermediate layer in accordance with embodiments of the present invention.

In certain embodiments, the refractive index of the resonant elements can be configured and operated as p-n junctions in order to change the refractive index of the resonant elements by carrier injection. FIG. 11 shows an isometric view a resonant element 1100 configured with a p-n junction intermediate layer 1102 in accordance with embodiments of the present invention. The p-n junction 1102 can be composed of a wide variety of semiconductor materials including various combinations of elemental and compound semiconductors. Indirect elemental semiconductors include silicon (Si) and germanium (Ge), and compound semiconductors include III-V materials, where Roman numerals III and V represent elements in the IIIa and Va columns of the Periodic Table of the Elements. Compound semiconductors can be composed of column IIIa elements, such as aluminum (Al), gallium (Ga), and indium (In), in combination with column Va elements, such as nitrogen (N), phosphorus (P), arsenic (As), and antimony (Sb). Compound semiconductors can also be further classified according to the relative quantities of III and V elements. For example, binary semiconductor compounds include semiconductors with empirical formulas GaAs, InP, InAs, and GaP; ternary compound semiconductors include semiconductors with empirical formula $GaAs_yP_{1-y}$, where y ranges from greater than 0 to less than 1; and quaternary compound semiconductors include semiconductors with empirical formula $In_xGa_{1-x}As_yP_{1-y}$, where both x and y independently range from greater than 0 to less than 1. Other types of suitable compound semiconductors include II-VI materials, where II and VI represent elements in the IIb and VIa columns of the periodic table. For example, CdSe, ZnSe, ZnS, and ZnO are empirical formulas of exemplary binary II-VI compound semiconductors.

As shown in FIG. 11, p-n junction 1102 includes a p-type layer and an n-type layer, where the p-type layer is doped with electron accepting impurities and the n-type layer is doped with electron donating impurities. The impurities also called dopants can be atoms. The dopants can be p-type impurities, which are atoms that introduce vacant electronic energy levels called "holes" to the electronic band gaps of the p-n junction 1102. These impurities are also called "electron acceptors." The dopants can be n-type impurities, which are atoms that introduce filled electronic energy levels to the electronic band gap of the p-n junction 1102. These impurities are called "electron donors." For example, boron (B), Al, and Ga are p-type impurities that introduce vacant electronic energy levels near the valence band of Si; and P, As, and Sb are n-type impurities that introduce filled electronic energy levels near the conduction band of Si. In III-V compound semiconductors, column VI impurities substitute for column V sites in the III-V lattice and serve as n-type impurities, and column II impurities substitute for column III atoms in the III-V lattice to form p-type impurities. Moderate doping of the p-type and n-type layers can have impurity concentrations in excess of about $10^{15}$ impurities/cm$^3$ while heavier doping can have impurity concentrations in excess of about $10^{19}$ impurities/cm$^3$.

The refractive index of the p-n junction 1102 can be adjusted by varying the magnitude and type of bias applied to p-n junction 1102. For example, a forward bias injects electrons into the n-type layer and vacant electronic states called "holes" are injected into the p-type layer. Under a reverse bias, electrons are injected into the p-type layer and holes are injecting into the n-type layer. However, once the bias is removed, the electrons and holes are swept out of the layers and the p-n junction 1102 returns to an unbiased electronic state. The refractive index of the p-n junction 1102 is different under the forward, reverse, and no bias.

Figure 12:
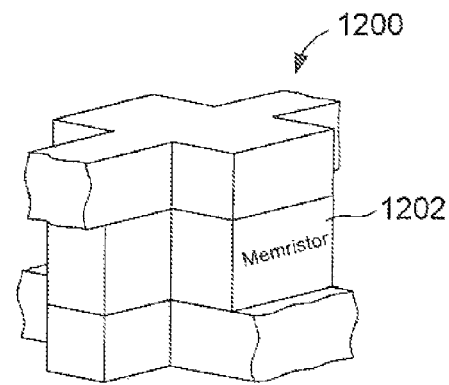
FIG. 12 shows an isometric view a resonant element configured with an intermediate memristors layer in accordance with embodiments of the present invention.
Figure 13:
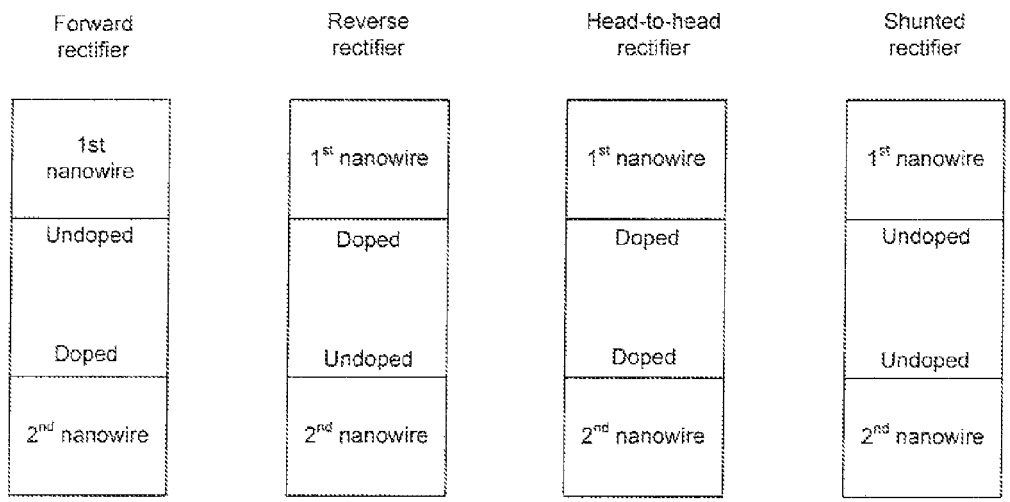
FIG. 13 shows four cross-sectional views of dopant distributions in memristor elements in accordance with embodiments of the present invention.

In other embodiments, the resonant elements can be configured as memristors that can change and retain their resistance state even after the bias has been removed. Each resistance state corresponds to a different refractive index. FIG. 12 shows an isometric view a resonant element 1200 configured with an intermediate memristors layer 1202 in accordance with embodiments of the present invention. The memristor layer 1202 includes a primary active region, or layer, and a secondary active region, or layer. The primary active region comprises a thin film of a material that is electronically semiconducting or nominally electronically insulating and can also be a weakly ionic conductor. The primary active material is capable of transporting and hosting ions that act as dopants to control the flow of electrons through the resonator element 1200. The basic mode of operation is to apply a voltage bias of an appropriate magnitude and polarity across the memristor layers at the junctions. The electrical field, also called a "drift field," enables the motion of the dopants in the primary material to drift into or out of the primary material via ionic transport. The ionic species are specifically chosen from those that act as electrical dopants for the primary material, and thereby change the rectifying state of the primary active material. The memristor layer 1202 can be placed in one of the four different types of rectifying states: a forward rectifier, a reverse rectifier, a head-to-head rectifier, and a shunted rectifier, as shown in FIG. 13. Each of the rectifying states corresponds to a different refractive index.

In addition, the primary active material and the dopants are chosen such that the drift of the dopants into or out of the primary active material is possible but not too facile in order to ensure that the memristor layer 1202 remains in a particular rectifying state for a reasonable period of time, perhaps for many years at room temperature. This ensures that the memristor layer 1202 is nonvolatile. In other words, the memristor layer 1202 holds its rectifying state (i.e., keeps memory of its resistive state) after the drift field has been removed. Applying a drift field with a large enough magnitude causes both electron current and dopant to drift, whereas applying biases with lower relative voltage magnitudes than the drift field causes negligible dopant drift enabling the element to hold its rectifying state.

On the other hand, the secondary active region comprises a thin film that is a source of dopants for the primary active material. These dopants may be impurity atoms such as hydrogen or some other cation, such as alkali or transition metals, that act as electron donors for the primary active material. Alternatively, the dopants can be anion vacancies, which in the primary active material are charged and therefore are also electron donors for the lattice. It is also possible to drive the anions into the primary active material, which become electron acceptors or hole donors.

The primary active material can be nanocrystalline, nanoporous, or amorphous. The mobility of the dopants in such nanostructured materials is much higher than in bulk crystalline material, since diffusion can occur through grain boundaries, pores or through local structural imperfections in an amorphous material. Also, because the primary active material film is thin, the amount of time needed for dopants to diffuse into or out of region of the film to substantially change the film's conductivity is relatively rapid. For example, the time needed for a diffusive process varies as the square of the distance covered, so the time to diffuse one nanometer is one-millionth the time to diffuse one micrometer.

The primary active and secondary active regions of the memristor layer 1202 are contacted on either side by nanowires or one of the nanowires can be composed of a semiconductor material and the other a metal. When the memristor layer 1202 is composed of semiconductor material, the contract between a metal electrode and the memristor layer 1202 depletes the memristor layer 1202 of free charge carriers. Thus, the memristor layer 1202 has a net charge that depends on the identity of the dopant which is positive in the case of electron donors and negative in the case of electron acceptors.

Switching from one rectifying state to another can be accomplished by applying an electric field of an appropriate magnitude and polarity across the memristor layer 1202. The electric field forces the dopants to drift into or out of the electrode/active region interface regions thus changing the rectifying state of the memristor layer 1202. For example, as shown in FIG. 13, an appropriate electric field can be used to force dopants located near the interfaces of the shunted rectifier to move to one of the interfaces thus changing the shunted rectifier into either the forward rectifier or the reverse rectifier.

The ability of the charged species to diffuse into and out of the primary active material is substantially improved if one of the interfaces connecting the memristor layer 1202 to a metal or semiconductor electrode is non-covalently bonded. Such an interface may be caused by a void in the material or it may be the result of an interface that contains a material that does not form covalent bonds with the electrode, the primary active material, or both. This non-covalently bonded interface lowers the activation energy of the atomic rearrangements that are needed for drift of the dopants in the primary active material. This interface is essentially an extremely thin insulator, and adds very little to the total series resistance of the element.

The primary and secondary active materials of the memristor layer 1202 can be oxides, sulfides, selenides, nitrides, phosphides, arsenides, chlorides, hydrides, and bromides of the transition and rare earth metals, with or without the alkaline earth metals being present. In addition, there are various alloys of these compounds with each other, which can have a wide range of compositions if they are mutually soluble in each other. In addition, the memristor layer 1202 can be composed of mixed compounds, in which there are two or more metal atoms combined with some number of electronegative elements. The dopants can be anion vacancies or different valence elements doped in the memristor layer 1202. One combination of materials is a primary active material that is undoped and stoichiometric, and thus a good insulator, combined with a secondary source/sink of the same or related parent material that either contains a large concentration of anion vacancies or other dopants that can drift into the primary material under the application of an appropriate bias.

The memristor layer 1202 can be composed of oxides that contain at least one oxygen atom (O) and at least one other element. In particular, the memristor layer 1202 can be composed of silica ($SiO_2$), titania ($TiO_2$), nickel-oxide (NiO), zirconia ($ZrO_2$), and hafnia ($HfO_2$) with or without 3d impurities (e.g., Cr, Mn), or sp-impurities (e.g., Li, Be, Ca). These materials are compatible with silicon (Si) integrated circuit technology because they do not create doping in the Si. Other embodiments for the memristor layer 1202 include alloys of these oxides in pairs or with all three of the elements Ti, Zr, and Hf present. For example, the memristor layer 1202 can be composed of $Ti_xZr_yHf_zO_2$, where $x+y+z=1$. Related compounds include titanates, zirconates, and hafnates. For example, titanates includes $ATiO_3$, where A represents one of the divalent elements strontium (Sr), barium (Ba) calcium (Ca), magnesium (Mg), zinc (Zn), and cadmium (Cd). In general, the memristor layer 1202 can be composed of $ABO_3$, where A represents a divalent element (e.g., $Sr^{++}$, $Ba^{++}$) and B represents $Ti^{4+}$, $Zr^{4+}$, and $Hf^{4+}$. The memristor layer 1202 can also be composed of alloys of these various compounds, such as $Ca_aSr_bBa_cTi_xZr_yHf_zO_3$, where $a+b+c=1$ and $x+y+z=1$. There are also a wide variety of other oxides of the transition and rare earth metals with different valences that may be used, both individually and as more complex compounds. In each case, the mobile dopant can be an oxygen vacancy or an aliovalent element doped into the memristor layer 1202. The oxygen vacancies effectively act as dopants with one shallow and one deep energy level. Because even a relatively minor nonstoichiometry of about 0.1% oxygen vacancies in $TiO_{2-x}$ is approximately equivalent to $10^{20}$ dopants/cm$^3$, modulating oxygen vacancy profiles have strong effect on electron transport.

In other embodiments, the memristor layer 1202 can be a sulfide or a selenide of the transition metals with some ionic bonding character, essentially the sulfide and selenide analogues of the oxides described above.

In other embodiments, the memristor layer 1202 can be a semiconducting nitride or a semiconducting halide. For example, semiconducting nitrides include AlN, GaN, ScN, YN, LaN, rare earth nitrides, and alloys of these compounds and more complex mixed metal nitrides, and semiconducting halides include CuCl, CuBr, and AgCl. The memristor layer 1202 can be a phosphide or an arsenide of various transition and rare earth metals. In all of these compounds, the mobile dopant can be an anion vacancy or an aliovalent element.

A variety of dopants can be used and are selected from a group consisting of hydrogen, alkali, and alkaline earth cations, transition metal cations, rare earth cations, oxygen anions or vacancies, nitrogen anions or vacancies, pnictide anions or vacancies, or halide anions or vacancies. Other suitable materials include metal hydrides, such as $Mg_2NiH_4$, $Mg_2MnH_7$, $Mg_6Co_2H_{11}$, $Mg_2CoH_5$, $Mg_2CoH_5$, and $Mg_2FeH_6$, and copper oxides, such as $Cu_2O$ and CuO, exhibit large changes in refractive indices.

Dynamically Reconfiguring an Optical Device

Figure 14:
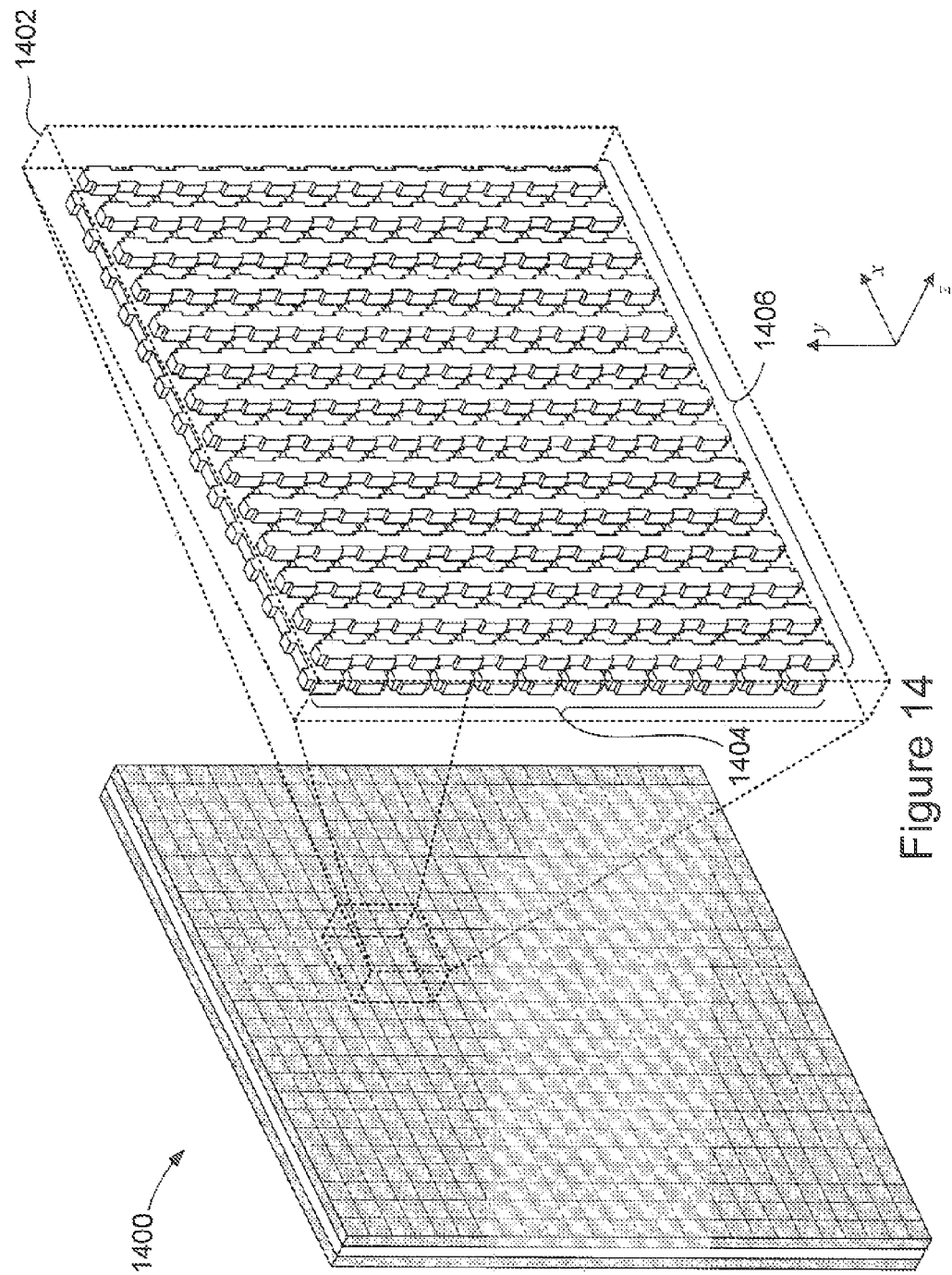
FIG. 14 shows an isometric view of an optical device configured in accordance with embodiments of the present invention.

FIG. 14 shows an isometric view of an optical device 1400 configured in accordance with embodiments of the present invention. An enlarged region 1402 reveals that the optical device 1400 is implemented as a crossbar NIM comprising an intermediate layer sandwiched between a first layer of substantially parallel nanowires 1404 and a second layer of approximately parallel nanowires 1406, where the nanowires in the first layer 1404 are approximately perpendicular to the nanowires in the second layer 1406. The optical device 1400 includes grid lines that outline a two-dimensional array of squares. Each square is referred to as "phase-modulation element" representing a single resonant element or two or more neighboring resonant elements. The resonant elements are configured and operated as described above with reference to the subsections Negative Index Material Crossbars and Resonant Elements. The optical device 1400 is a resonant plasmonic metamaterial that can be operated to exhibit negative refraction for electromagnetic radiation with particular wavelengths of interest. The resonant behavior translates into phase changes of refracted wavelength of the interest. The effective refractive index of each phase-modulation element can be independently and electronically controlled. In other words, the phase-modulation elements are "electronically addressable."

Figure 15:
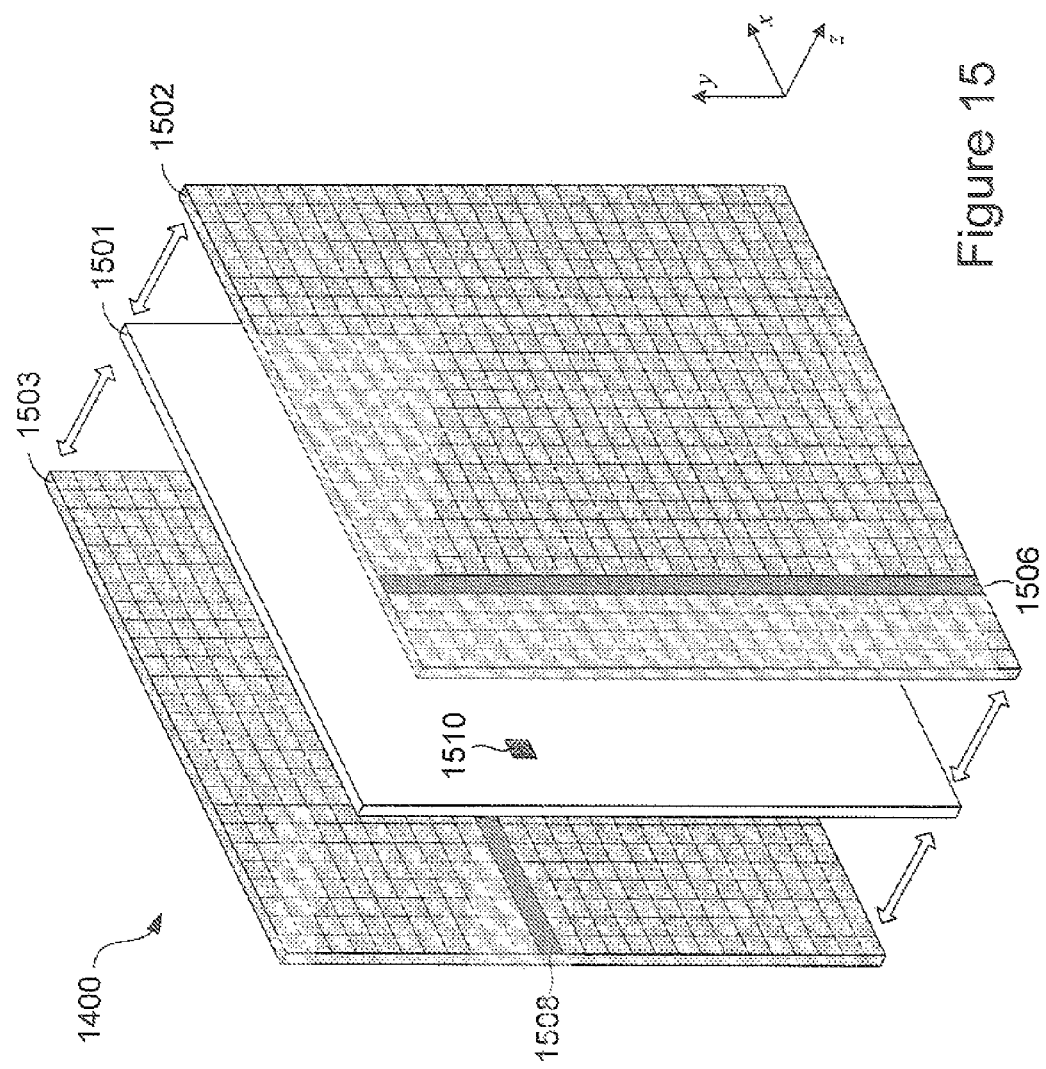
FIG. 15 shows an exploded isometric view of the optical device shown in FIG. 14 in accordance with embodiments of the present invention.

FIG. 15 shows an exploded isometric view of the optical device 1400 comprising an intermediate layer 1501 sandwiched between two outer nanowire layers 1502 and 1503, as described above with reference to FIG. 7. The intermediate layer 1501 serves as a phase-modulation layer as described below and, hereinafter, is also referred to as the phase-modulation layer 1501. Each phase-modulation element is electronically addressed by applying appropriate electronic signals to substantially orthogonal overlapping nanowires defining the phase-modulation element. For example, as shown in FIG. 15, applying an appropriate electronic signal to nanowires 1506 of nanowire layer 1502 and simultaneously applying an appropriate electronic signal to nanowires 1508 of nanowire layer 1503 produces a voltage across, or current passing through, a region 1510 of layer 1501 causing the refractive index of the region 1510 to change. The degree to which the refractive index is changed can vary depending on the magnitude of the electronic signal applied to the region 1510.

Figure 16:
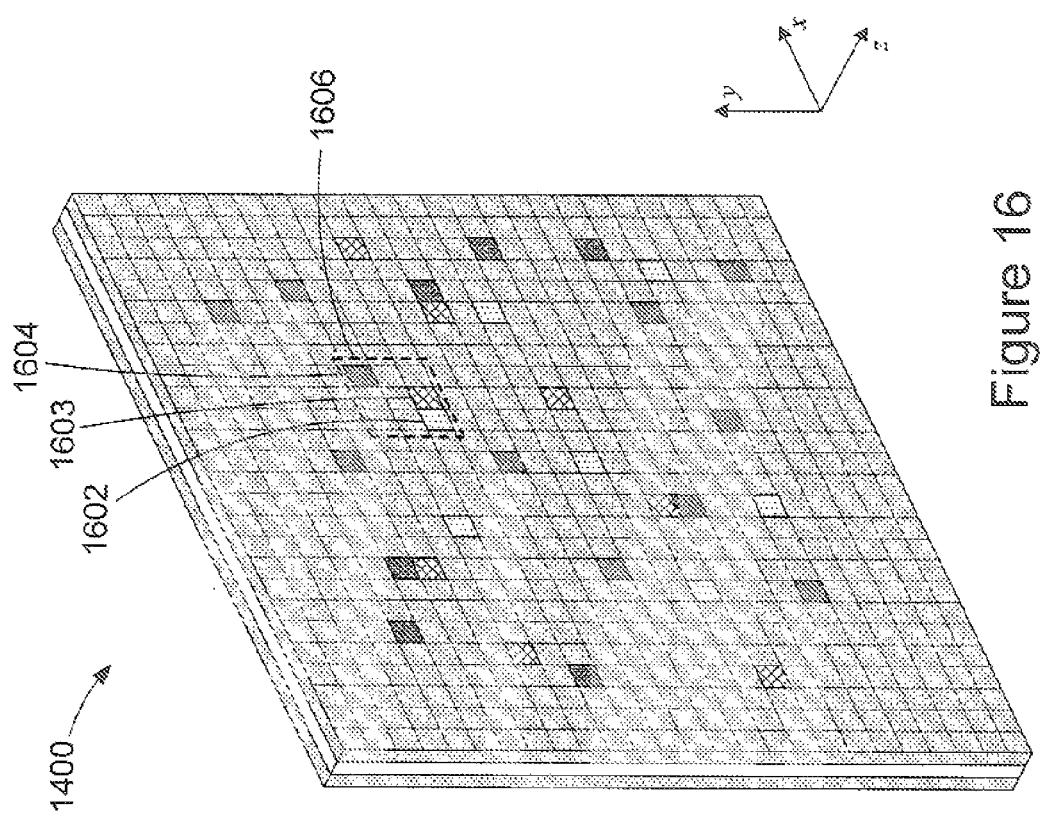
FIG. 16 shows a number of phase-modulation elements with different refractive indices in accordance with embodiments of the present invention.

The effective refractive index of each phase-modulation element can be varied by applying particular voltages or currents to each element. FIG. 16 shows a number of phase-modulation elements having different refractive indices in accordance with embodiments of the present invention. Each phase-modulation element is electronically addressable as described above with reference to FIG. 15, and depending on the magnitude of the electronic signal applied to each element, the effective refractive index of each element can be separately adjusted. For example, shaded phase-modulation elements 1602-1604 of a region 1606 each represent elements having different effective refractive indices which result from applying different voltages or currents to each of the elements 1602-1604. The change in the effective refractive index can range from a few percent to approximately 10%, but coupled with a resonant negative element, the change in the effective refractive index is larger.

Figure 17:
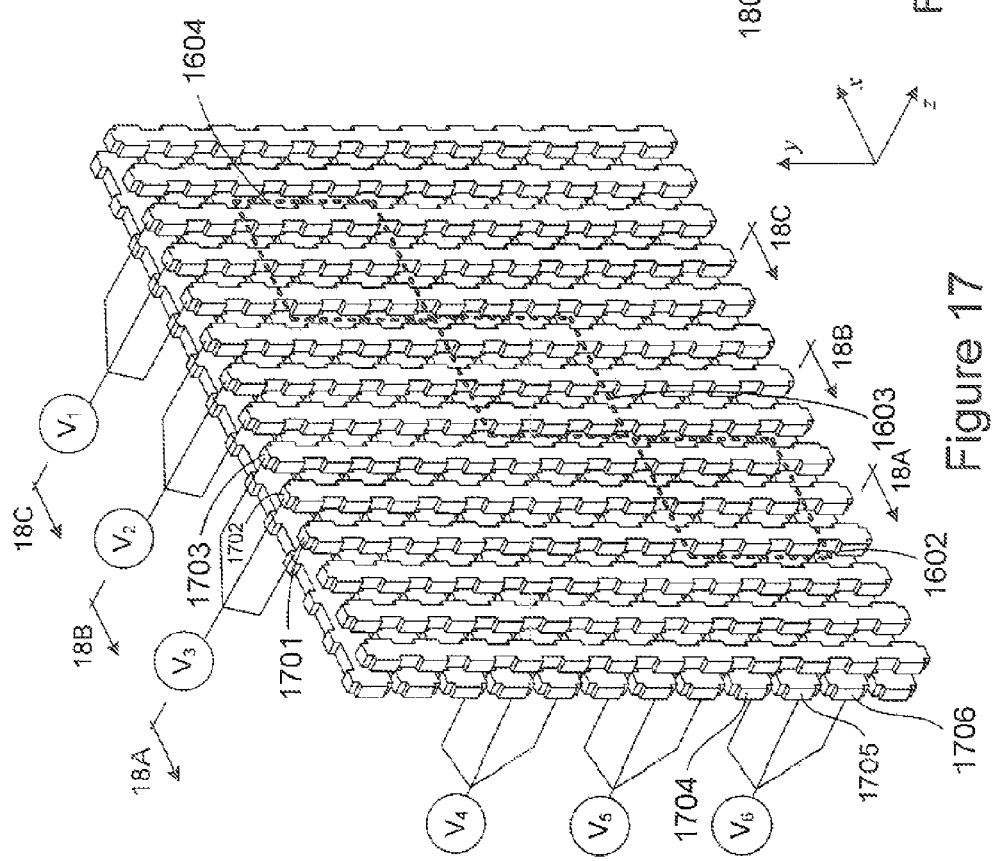
FIG. 17 shows an isometric view and enlargement of a region of the optical device shown in FIG. 16 in accordance with embodiments of the present invention.

FIG. 17 shows an isometric view and enlargement of the region 1606 of the optical device 1400 shown in FIG. 16 in accordance with embodiments of the present invention. The phase-modulation elements 1602-1604 of FIG. 16 are enlarged and identified in FIG. 17 by dashed-line enclosures. The phase-modulation elements 1602-1604 are each composed of a square array of 9 resonant elements. A change in the effective refractive index of a phase-modulation element is the result of changes in the effective refractive indices of the resonant elements comprising the phase-modulation element. As described above in the subsections Negative Index Material Crossbars and Resonant Elements, an effective refractive index change of a resonant element can be the result of changes in an oxidation or redox state, resistivity, variation in ion concentration, injection of charge carriers under a forward or reverse bias, or any other source of refractive index change. A change in the effective refractive index of a resonant element depends on the chemical composition of the intermediate layer of the resonant element and on the magnitude and polarity of the current or voltage applied to the resonant element. As shown in FIG. 17, the individual nanowires of the phase-modulation elements 1602-1604 are electronically coupled to voltage sources so that the resonant elements of each phase-modulation element can be individually and electronically addressed. The effective refractive indices of the resonant elements comprising the phase-modulation element 1602 are changed by applying the same voltage $V_3$ to the nanowires 1701-1703 and a different voltage $V_6$ to all three of the nanowires 1704-1706 resulting in applying the same voltage across each of the nine resonant elements comprising the phase-modulation element 1602. As a result, the effective refractive indices of the individual resonant elements comprising the phase-modulation element 1602 are changed to the same effective refractive index, and electromagnetic radiation transmitted through the phase-modulation element 1602 acquires a transmission phase shift. For example, the effective refractive index of the nine resonant elements comprising the phase-modulation element 1602 can be shifted as described above with reference to plots 1002 and 1004 of FIG. 10. The phase-modulation elements 1603 and 1604 are also separately and electronically addressed by applying different sets of voltages to the corresponding nanowires to produce different effective refractive indices.

Figure 18A:
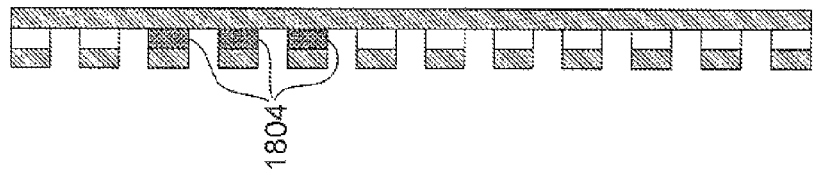
FIGS. 18A-18C show cross-sectional views of the regions shown in FIG. 17 in accordance with embodiments of the present invention.
Figure 18B:
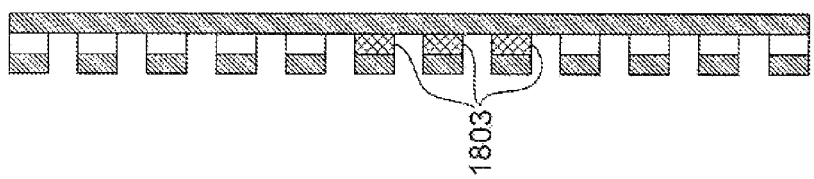
Figure 18C:
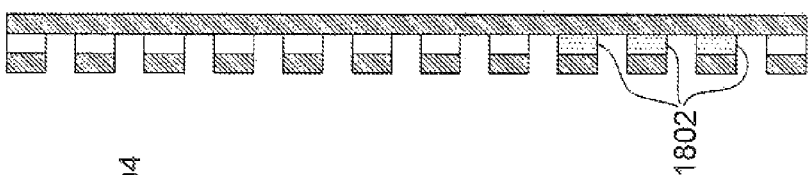

FIG. 18A shows a cross-sectional view along a line 18A-18A, shown in FIG. 17, of the phase-modulation element 1602 operated in accordance with embodiments of the present invention. Shaded resonant elements 1802 represent three of the nine resonant elements comprising the phase-modulation element 1602. FIG. 18B shows a cross-sectional view along a line 18B-18B, shown in FIG. 17, of the phase-modulation element 1603 operated in accordance with embodiments of the present invention. Shaded resonant elements 1803 represent three of the nine resonant elements comprising the phase-modulation element 1603. FIG. 18C shows cross-sectional view along a line 18C-18C, shown in FIG. 17, of the phase-modulation element 1604 operated in accordance with embodiments of the present invention. Shaded resonant elements 1804 represent three of the nine resonant elements comprising the phase-modulation element 1604.

Embodiments of the present invention are not limited to phase-modulation elements comprising a square array of nine resonant elements. Because voltages can be applied to individual crossed nanowires, the number of square array resonant elements comprising a single phase-modulation element can range from as few as 4 to hundreds or even thousands of resonant elements. In addition, the individual nanowires enable phase-modulation elements to have various shapes such as square, rectangular, circular, elliptical, triangular, or any other suitable shape.

Figure 19:
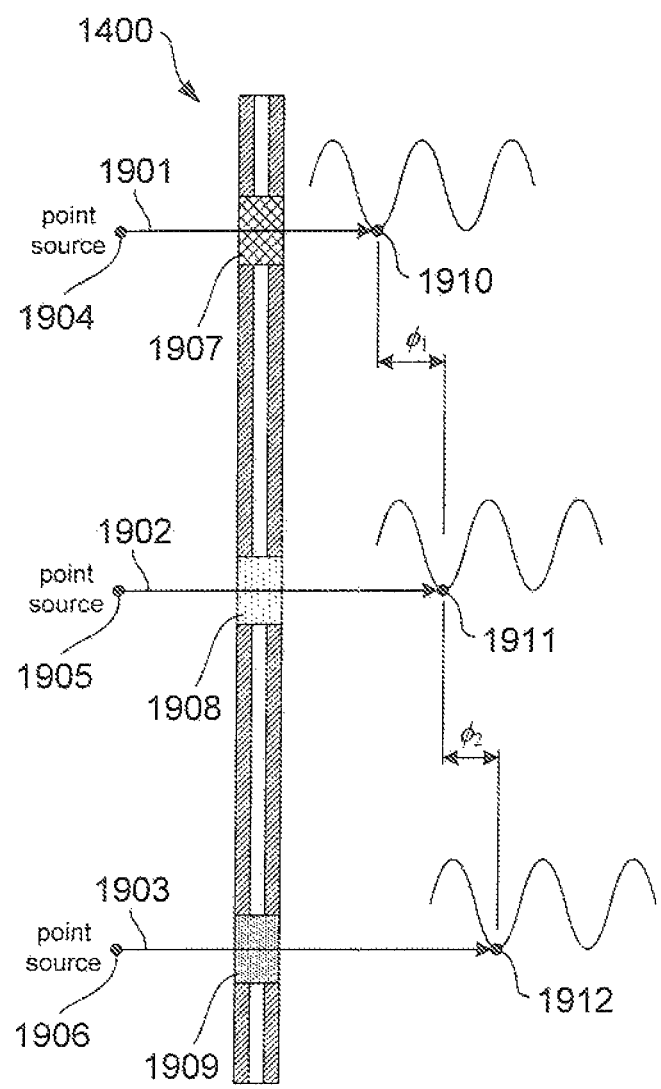
FIG. 19 shows a side view of electromagnetic radiation transmitted through three phase-modulation elements of an optical element operated in accordance with embodiments of the present invention.

FIG. 19 shows a side view of electromagnetic radiation transmitted through three phase-modulation elements of the optical element 1400 operated in accordance with embodiments of the present invention. Rays of electromagnetic radiation 1901-1903 emanating from point sources 1904-1906 pass through phase-modulation elements 1907-1909, respectively. In the example shown in FIG. 19, each phase-modulation element is electronically addressed, as described above with reference to FIG. 17, and has a different refractive index with phase-modulation element 1907 having the largest refractive index, phase-modulation element 1908 having the second largest refractive index, and phase-modulation element 1909 having the smallest refractive index. As rays 1901-1903 enter associated phase-modulation elements 1907-1909, the electromagnetic radiation slows to a velocity $v=c/n$ where v is the velocity of electromagnetic radiation propagating through a phase-modulation element, c is the speed of electromagnetic radiation in free space, and n is the magnitude of the effective refractive index of the phase-modulation element. Thus, the ray 1904 passing through the phase-modulation element 1907 has the slowest velocity, the ray 1905 passing through the phase-modulation element 1908 has the second slowest velocity, and the ray 1906 has the highest relative velocity. As shown in FIG. 19, points 1910-1912 represent points on electromagnetic waves that simultaneously enter the phase-modulation elements 1907-1909, respectively, but due to the different refractive indices at each phase-modulation element, the points 1910-1912 of the electromagnetic waves emerge at different times from the phase-modulation elements 1907-1909 and, therefore, are located at different distances from the optical element 1400. In other words, the electromagnetic waves emerging from the phase-modulation elements 1907-1909 acquire transmission phase shifts. As shown in FIG. 19, the relative phase difference between the electromagnetic waves emerging from phase-modulation elements 1907 and 1908 is $\phi_1$, and the relative phase difference between electromagnetic waves emerging from phase-modulation elements 1908 and 1909 is $\phi_2$, with the greatest relative phase difference of $\phi_1+\phi_2$ for electromagnetic waves emerging from phase-modulation elements 1907 and 1909. The electronic signal applied to the phase-modulation elements 1907-1909 can be rapidly modulated, which, in turn, rapidly modulates the effective refractive indices of the phase-modulation elements 1907-1909 resulting in rapid changes in relative phase differences between rays emerging from the phase-modulation elements 1907-1909.

Figure 20:
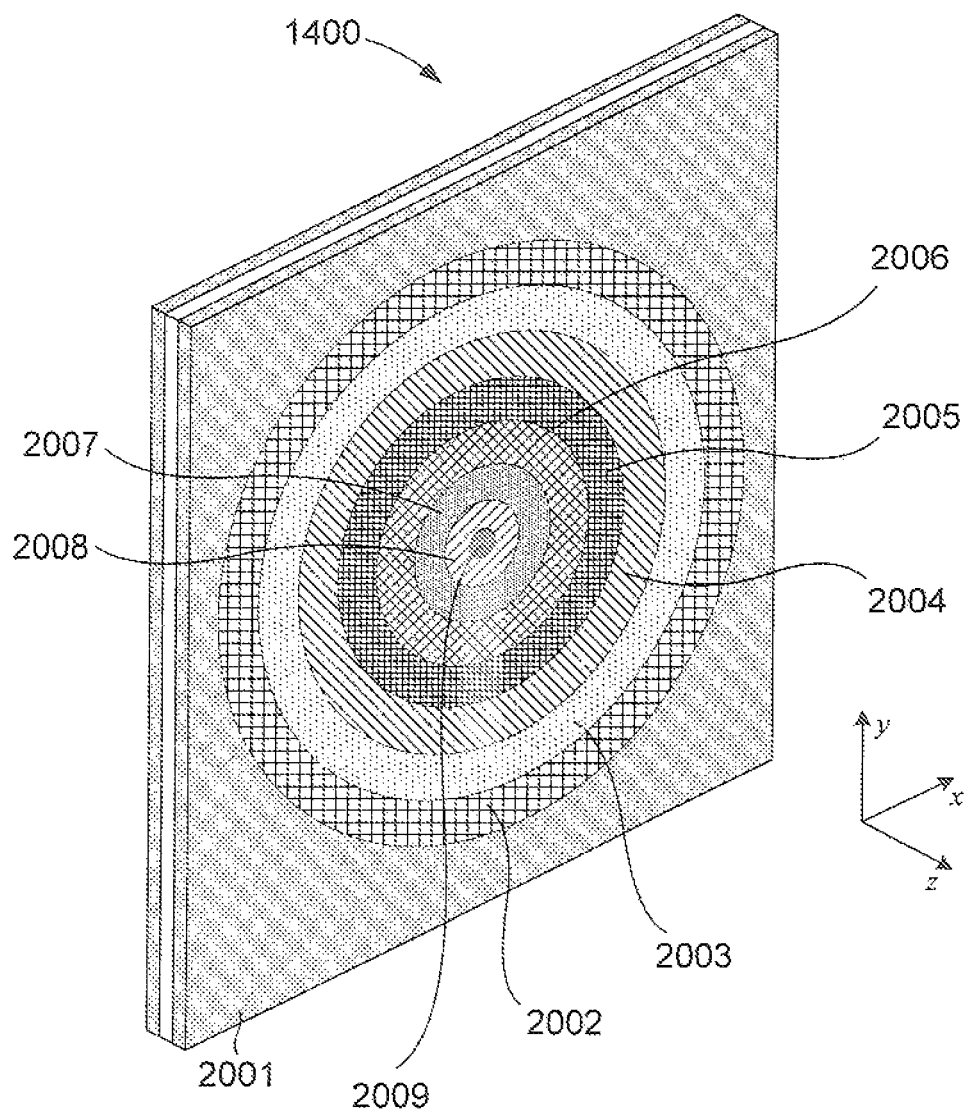
FIG. 20 shows a schematic representation of an optical device operated as a converging or a diverging lens in accordance with embodiments of the present invention.

FIG. 20 shows a schematic representation of the optical device 1400 operated as a converging or a diverging lens in accordance with embodiments of the present invention. The optical device 1400 includes an effective refraction index pattern of annular regions 2002-2009 emanating from the center of the optical device 1400 each represent electronically configured phase-modulation elements having substantially the same effective refractive index. For example, the phase-modulation elements in annular region 2002 are electronically configured as described above with reference to FIGS. 15-18 to have substantially the same effective refractive index.

In operating the optical device 1400 as a converging lens, the magnitude of the effective refractive index of the annular regions 2002-2009 increase from the outer most annular region 2002 to the inner most annular region 2009. For example, the magnitude of the effective refractive index of the annular region 2008 is larger than the effective refractive index of the annular region 2007. As a result, the relative rate at which electromagnetic radiation of an appropriate wavelength λ passes through the optical device 1400 relatively increases from the physical center of the optical device 1400 toward the outer regions of the optical device 1400.

Figure 21:
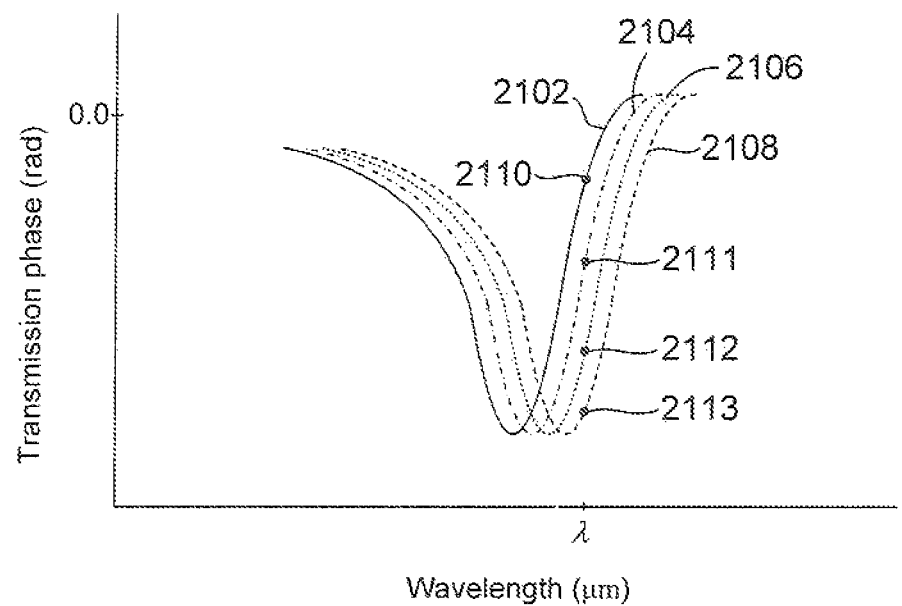
FIG. 21 shows a plot of transmission phases associated with four annular regions of the optical device shown in FIG. 20 in accordance with embodiments of the present invention.

FIG. 21 shows a plot of transmission phases associated with four of the annular regions represented in FIG. 20 in accordance with embodiments of the present invention. Curves 2102, 2104, 2106, and 2108 represent the transmission phase of electromagnetic radiation over a range of wavelengths and correspond to the transmission phase acquired by electromagnetic radiation passing through the annular regions 2002, 2004, 2006, and 2008, respectively. Points 2110-2113 correspond to that transmission phase acquired by electromagnetic radiation with a wavelength of interest λ passing through the annular regions 2002, 2004, 2006, and 2008 and indicate that portions of the electromagnetic radiation acquire a relatively larger transmission phase toward the center of the optical device 1400 than for portions of the electromagnetic radiation passing through the optical device 1400 farther away from the physical center. For example, points 2110 and 2113 indicate that as the electromagnetic radiation passes through annular regions 2002 and 2008, respectively, the portion of the electromagnetic radiation passing through the annular region 2008 acquires a relatively larger transmission phase than the electromagnetic radiation passing through the annular region 2008.

Figure 22:
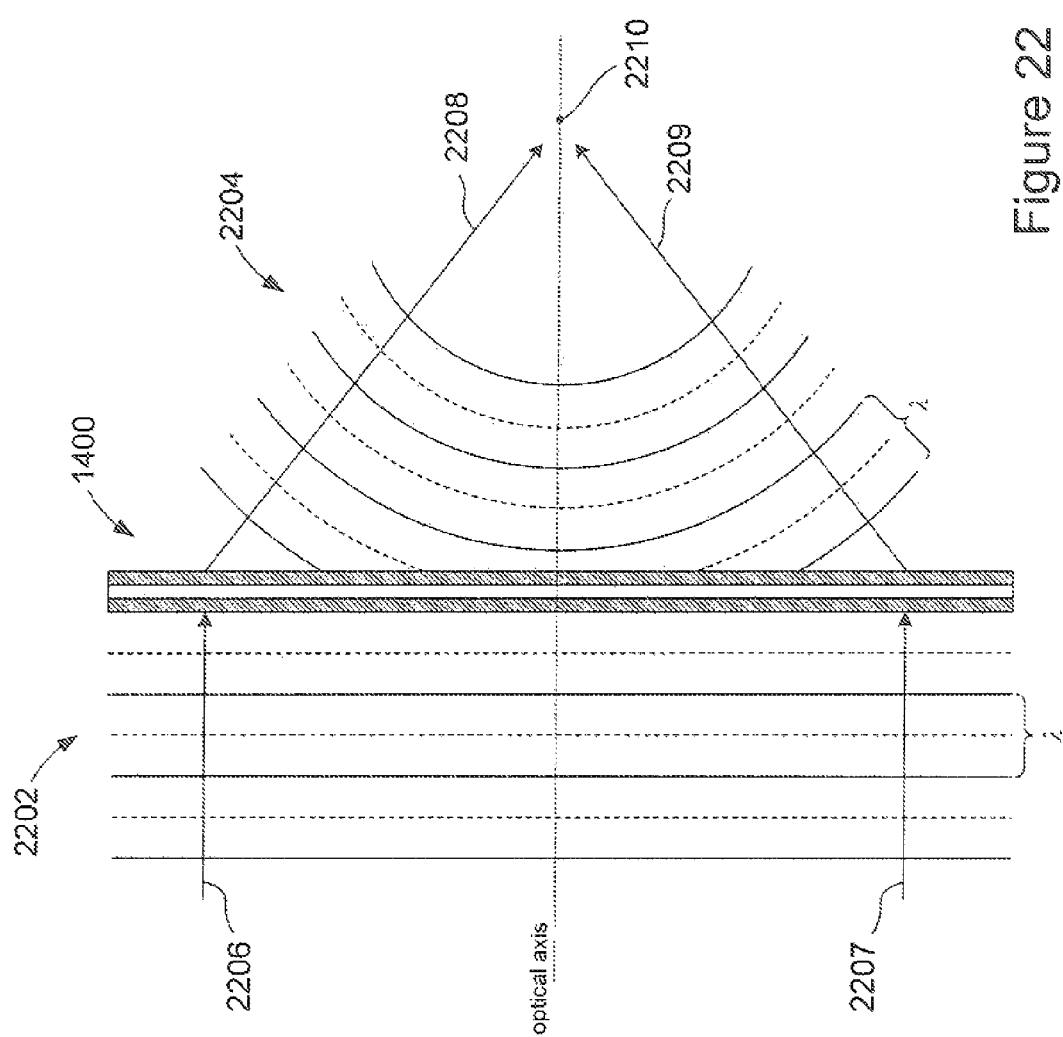
FIG. 22 shows a side view of an optical device operated as a converging lens in accordance with embodiments of the present invention.

FIG. 22 shows a side view of the optical device 1400 operated as a converging lens in accordance with embodiments of the present invention. The electromagnetic radiation passing through the optical device 1400 is quasimonochromatic electromagnetic radiation with the wavelength λ. Ideally monochromatic electromagnetic radiation is used. However, in practice, it is recognized that an electromagnetic radiation source does not emit monochromatic electromagnetic radiation but instead can emit electromagnetic radiation in a narrow band of wavelengths, which is called "quasimonochomatic electromagnetic radiation." Quasimonochromatic electromagnetic radiation enters the optical element 1400 with uniform wavefronts 2202 of wavelength λ. Each wavefront crest is identified by a solid line and each wavefront trough is identified by a dashed line. As shown in FIG. 22, each wavefront enters the optical element 1400 with substantially the same phase. The phase-modulation elements (not identified) of the optical element 1400 are selectively addressed as described above with reference to FIGS. 20-21 to produce curved wavefronts 2204. The curved wavefronts 2204 result from portions of the incident uniform wavefronts 2202 passing through phase-modulation elements located toward the center of the optical device 1400 that have been electronically configured with relatively higher effective refractive index magnitudes than the annular regions located farther out from the center of the optical device 1400. As a result, portions of the electromagnetic radiation passing through the optical device 1400 near the center of the optical device 1400 acquire a larger transmission phase than electromagnetic radiation passing through the optical device 1400 farther out from the center of the optical device 1400 and the incident beam is refracted by focusing the beam to a focal point 2210. Rays 2206-2209 represent refraction of portions of the beam of electromagnetic radiation passing through the optical device 1400 such that the beam is focused at a focal point 2210.

FIGS. 20-21 can also be used to describe operating the optical device 1400 as a diverging lens. In particular, returning to FIG. 20, the optical device 1400 can be operated as a diverging lens by electronically addressing the phase-modulation elements of the pattern of annular regions 2002-2009 with effective refractive indices that increase from the center of the optical device 1400. For example, in operating the optical device 1400 as a divergent lens case, the phase-modulation elements in annular region 2002 are electronically addressed as described above with reference to FIGS. 15-18 to have relatively larger effective refractive indices than the annular region 2008. Also returning to FIG. 21, curves 2102, 2104, 2106, and 2108 can correspond to annular regions 2008, 2006, 2004, and 2002, respectively. Points 2110-2113 indicate that portions of the electromagnetic radiation acquire a relatively smaller transmission phase toward the center of the optical device 1400 than for portions of the electromagnetic radiation passing through the annular regions located farther away from the physical center of the optical device 1400.

FIG. 23 shows a side view of the optical device 1400 operated as a diverging lens in accordance with embodiments of the present invention. The electromagnetic radiation passing through the optical device 1400 is quasimonochromatic electromagnetic radiation with the wavelength λ. Quasimonochromatic electromagnetic radiation enters the optical element 1400 with uniform wavefronts 2302 of wavelength λ and with substantially the same phase. The phase-modulation elements (not identified) of the optical element 1400 are selectively addressed as described above with reference to FIGS. 20-21 to produce curved wavefronts 2304. The curved wavefronts 2304 result from portions of the incident uniform wavefronts 2302 passing through phase-modulation elements located toward the center of the optical device 1400 that have been electronically addressed with relatively smaller effective refractive index magnitudes than the annular regions located farther out from the center of the optical device 1400. As a result, portions of the electromagnetic radiation passing through the optical device 1400 near the center of the optical device 1400 acquire a smaller transmission phase than electromagnetic radiation passing through the optical device 1400 farther out from the center of the optical device 1400. Rays 2306-2309 represent refraction of portions of the beam of electromagnetic radiation passing through the optical device 1400 such that the beam diverges or spreads out away from the optical device 1400.

The pattern of ring-shaped concentric annular regions described above with reference to FIG. 20 is merely one example of the possible patterns and shapes of different regions of the optical device 1400 that can be employed in operating the optical device 1400 as a converging or a diverging lens. In other embodiments, the pattern of regions can be concentric elliptical, square, rectangular, irregularly shaped regions, or any other suitable pattern of regions for focusing or diverging transmitted electromagnetic radiation. In addition, embodiments of the present invention are not limited to just patterns comprising eight regions in operating the optical device 1400, the number of regions can be increased so that electromagnetic radiation passing through the optical device 1400 experiences a nearly continuous range of effective refractive indices.

The optical element 1400 can also be operated as a prism to refract or bend transmitted electromagnetic radiation in a selected direction. FIG. 24 shows the optical device 1400 operated as a prism by electronically addressing the phase-modulation elements of a pattern of regions 2402-2409 with effective refractive indices that increase from the region 2409 to the region 2402. For example, the phase-modulation elements in region 2408 are electronically addressed as described above with reference to FIGS. 15-18 to have relatively larger effective refractive indices than the region 2407.

FIG. 25 shows a side view of the optical device 1400 operated as a prism in accordance with embodiments of the present invention. Quasimonochromatic electromagnetic radiation enters the optical element 1400 with uniform wavefronts 2502 of wavelength λ and with substantially the same phase. The increasing effective refractive indices of the regions 2402-2409 causes the incident beam with uniform wavefronts 2502 to bend as indicated by the angled wavefront 2504. In other words, portions of the electromagnetic radiation passing through the optical device 1400 near the region 2402 acquire a relatively smaller transmission phase than electromagnetic radiation passing through the optical device 1400 near the region 2409. Rays 2506-2509 indicate that electromagnetic radiation passing through the optical device 1400 diverges or spreads out. Rays 2506-2509 represent refraction of the beam of electromagnetic radiation passing through the optical device 1400 such that the output beam bends away from the optical axis.

Figure 26:
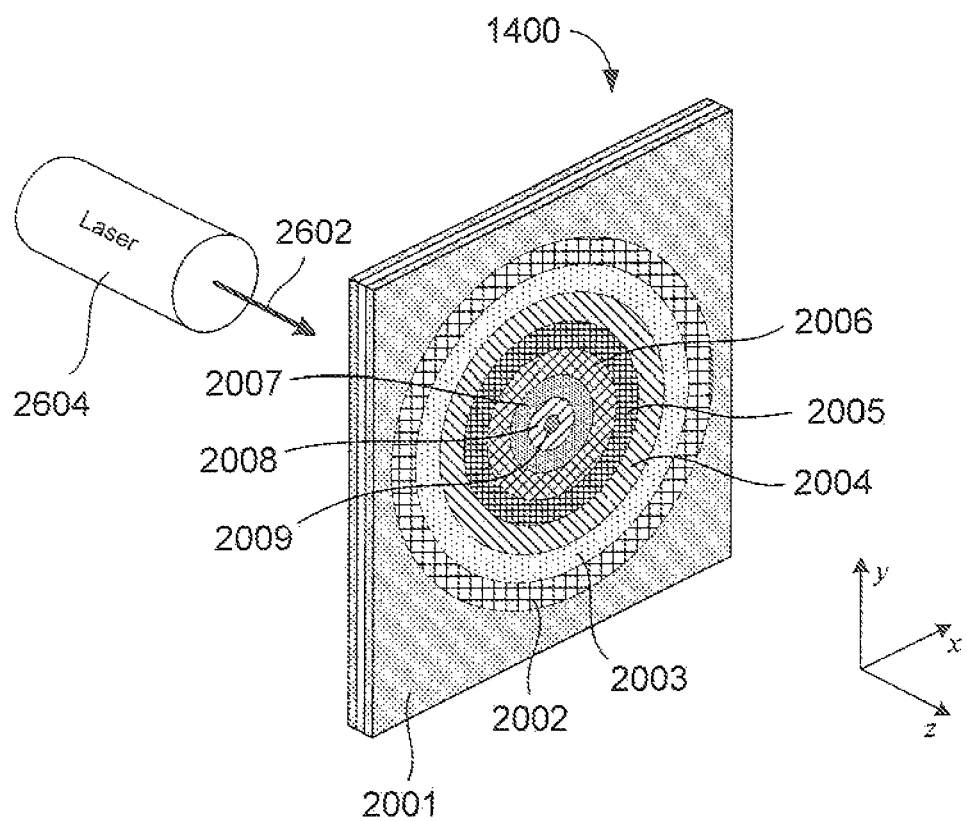
FIG. 26 shows an optical device in the path of a laser beam output from a laser in accordance with embodiments of the present invention.

In other embodiments of the present invention, the optical device 1400 can be mounted in the path of a laser beam to sharpen the transverse profile of the laser beam. FIG. 26 shows the optical device 1400 in the path of a laser beam 2602 output from a laser 2604. The annular regions 2002-2009 are electronically addressed such that the effective refractive indices of the inner annular regions 2007-2009 substantially transmit the laser beam 2602 and the outer annular regions 2002-2006 are electronically addressed to substantially block the transmission of the laser beam 2602.

Figure 27:
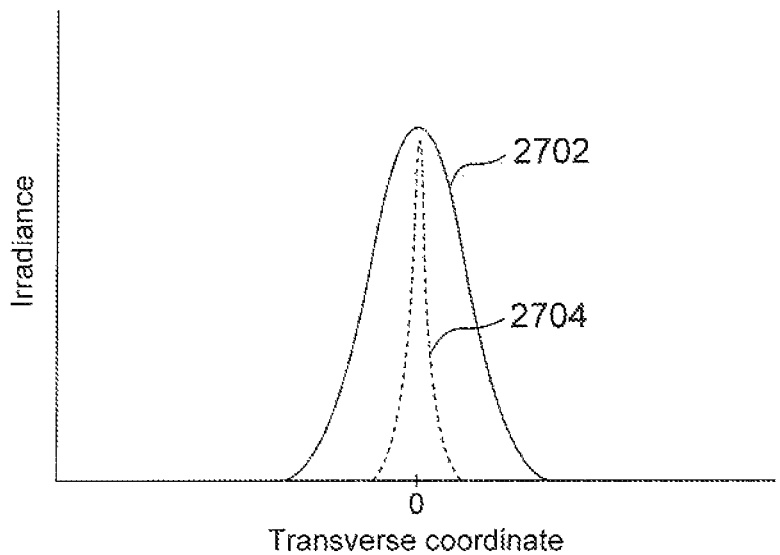
FIG. 27 shows plots of a transverse profile of a Gaussian beam amplitude output from a laser and a transverse profile of the same beam passed through an optical device operated in accordance with embodiments of the present invention.

FIG. 27 shows plots of a transverse profile 2702 of a Gaussian beam amplitude 2702 output from a laser and a transverse profile 2704 of the same beam passed through the optical device 1400 operated in accordance with embodiments of the present invention. As shown in FIG. 27, the optical device 1400 can be operated as described above with reference to FIG. 26 to sharpen the profile of a Gaussian beam 2602 output from the laser 2604.

Figure 28:
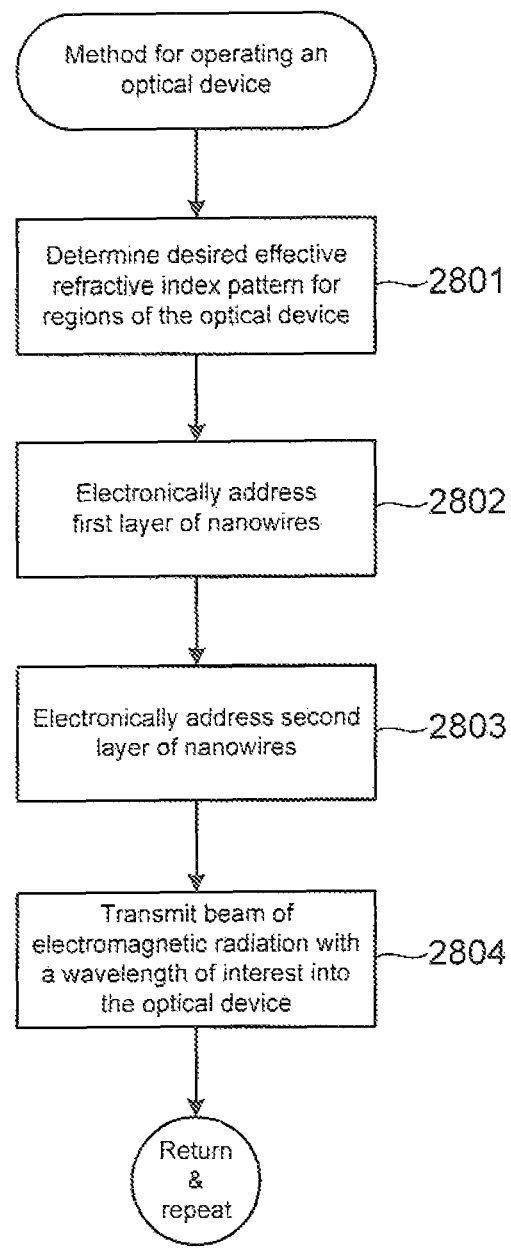
FIG. 28 shows a control-flow diagram of a method for focusing, diverging, or bending an incident beam of electromagnetic radiation with a wavelength of interest in accordance with embodiments of the present invention.

FIG. 28 shows a control-flow diagram a method for focusing, diverging, or bending an incident beam of electromagnetic radiation with a wavelength of interest. In step 2801, a pattern of effective refractive indices for the optical device 1400 is determined for focusing, diverging, or bending the incident beam of electromagnetic radiation, as described above with reference to FIGS. 20-26. In step 2802, appropriate corresponding electronic signals are applied to a first set of nanowire in the first layer of nanowires of the optical device 1400. In step 2803, appropriate corresponding electronic signals are applied to a second set of nanowires in the second layer of nanowires of the optical device 1400. Note that steps 2802 and 2803 can be performed simultaneously. In step 2804, an incident beam of electromagnetic radiation with the wavelength of interest λ is transmitted into the optical device 1400 as described above with reference to FIGS. 20-26.

The optical device 1400 can be operated as described above by a hardware system that allows a user to electronically address each resonant element as described above with reference to FIG. 17. The hardware system can be any electronic device, including, but not limited to: a desktop computer, a laptop computer, a portable computer, a display system, a computer monitor, a navigation system, a personal digital assistant, a handheld electronic device, an embedded electronic device, or an appliance.

Figure 29:
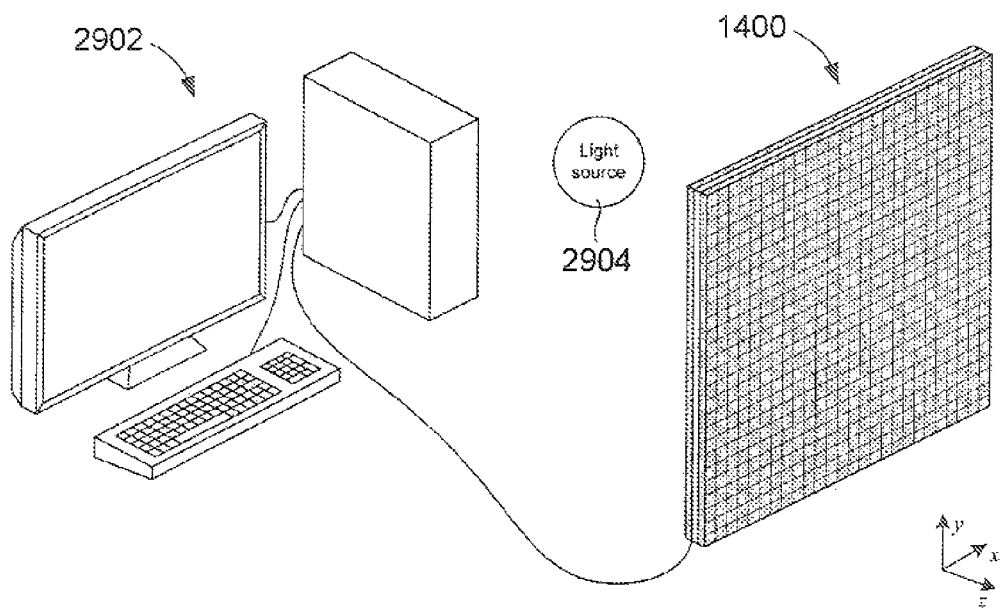
FIG. 29 shows an example of an optical device electronically coupled to a desktop computer in accordance with embodiments of the present invention.

FIG. 29 shows an example of the optical device 1400 electronically coupled to a desktop computer 2902 in accordance with embodiments of the present invention. The desktop computer 2902 and the optical device 1400 can include applications that enable the desktop computer 2902 to electronically address individual resonant elements and thereby operate the optical device 1400 as a converging lens, a diverging lens, or as a prism. In particular, the desktop computer 2902 can control the focal length, the focal point, whether the optical device 1400 is operated as a converging lens, a diverging lens, or as a prism for electromagnetic radiation emitted from the source 2904

Figure 30:
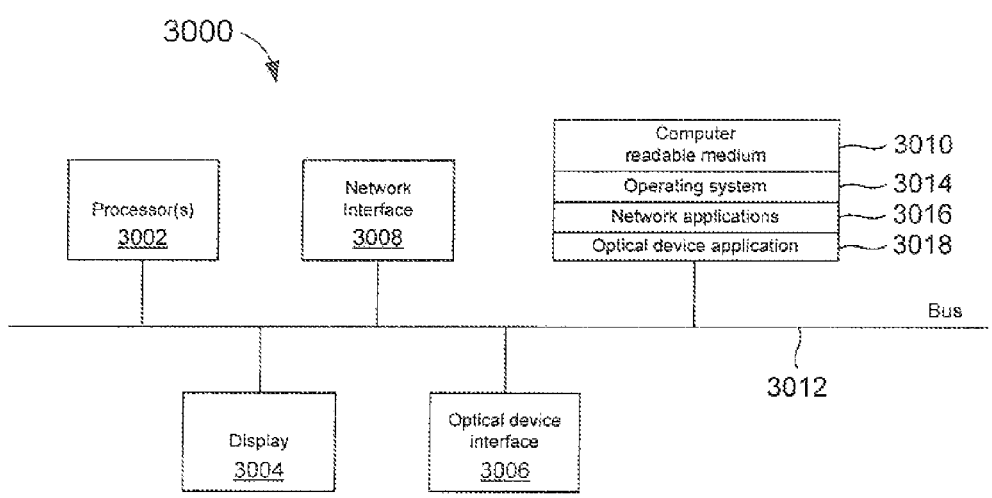
FIG. 30 shows a schematic representation of a hardware system configured in accordance with embodiments of the present invention.

FIG. 30 shows a schematic representation of a hardware system 3000 configured in accordance with embodiments of the present invention. The system 3000 includes one or more processors 3002, such as a central processing unit; one or more display devices 3004, such as a monitor; an optical device 1400 interface 3006; one or more network interfaces 3008, such as a USB port, an Ethernet, or FireWire port; one or more computer-readable mediums 3010. Each of these components is operatively coupled to one or more buses 3012. For example, the bus 3012 can be an EISA, a PCI, a USB, a FireWire, a NuBus, or a PDS.

The computer readable medium 3010 can be any medium that participates in providing instructions to the processor 3002 for execution and storage of data regarding electronically addressing the optical device 1400. For example, the computer readable medium 3010 can be non-volatile media, such as an optical or a magnetic disk; volatile media, such as memory; and transmission media, such as coaxial cables, copper wire, and fiber optics. Transmission media can also take the form of acoustic, electromagnetic radiation, or radio frequency waves.

The computer-readable medium 3010 also includes an operating system 3014, such as Mac OS, Windows, Unix, and Linux; a network communications module 3016; and an intrinsic image application 3018. The operating system 3014 can be multi-user, multiprocessing, multitasking, multithreading, real-time and the like. The operating system 3014 can also perform basic tasks such as recognizing input from input devices, such as a keyboard or a keypad; sending output to the display 3004; keeping track of files and directories on medium 3010; controlling peripheral devices, such as disk drives, printers, optical device 1400; and managing traffic on the one or more buses 3012. The network applications 3016 includes various components for establishing and maintaining network connections, such as software for implementing communication protocols including TCP/IP, HTTP, Ethernet, USB, and FireWire. The computer readable medium 3010 can also store other software applications, including word processors, browsers, e-mail, Instant Messaging, and media players.

The optical device application 3018 provides various software components for enabling electronic addressing of resonant elements, as described above with reference to FIG. 17. In certain embodiments, some or all of the processes performed by the application 3018 can be integrated into the operating system 3014. In certain embodiments, the processes can be at least partially implemented in digital electronic circuitry, or in computer hardware, firmware, software, or in any combination thereof.

The foregoing description, for purposes of explanation, used specific nomenclature to provide a thorough understanding of the invention. However, it will be apparent to one skilled in the art that the specific details are not required in order to practice the invention. The foregoing descriptions of specific embodiments of the present invention are presented for purposes of illustration and description. They are not intended to be exhaustive of or to limit the invention to the precise forms disclosed. Obviously, many modifications and variations are possible in view of the above teachings. The embodiments are shown and described in order to best explain the principles of the invention and its practical applications, to thereby enable others skilled in the art to best utilize the invention and various embodiments with various modifications as are suited to the particular use contemplated. It is intended that the scope of the invention be defined by the following claims and their equivalents:

The invention claimed is:

1. A dynamically reconfigurable optical device comprising:
   a first layer of approximately parallel first nanowires;
   a second layer of approximately parallel second nanowires that overlay the first nanowires in the first layer, wherein the first nanowires in the first layer are approximately perpendicular in orientation to the second nanowires in the second layer; and
   a phase-modulation layer disposed between the first and second nanowire layers, overlapping ones of the first and second nanowires to be electronically addressed to implement a selected effective refractive index pattern of one or more regions of the phase-modulation layer to cause corresponding ones of the one or more regions to refract a portion of an incident beam of electromagnetic radiation having a wavelength in order to focus or diverge the incident beam, wherein the effective refractive index pattern of the one or more regions are annular regions.

2. The optical device of claim 1 wherein each of the nanowires in the first and second layers of nanowires further comprises substantially regularly spaced fingers.

3. The optical device of claim 1 wherein overlapping ones of the first and second nanowires further comprise resonant elements, wherein each resonant element includes a portion of the phase-modulation layer sandwiched between two fingers of a respective one of the first nanowires in the first layer and two fingers of a respective one of the second nanowires in the second layer.

4. The optical device of claim 1 wherein fingers of adjacent ones of the first nanowires within the first layer are substantially aligned;
   notches between the fingers of the first nanowires in the first layer are substantially aligned with notches between fingers of the second nanowires in the second layer; and
   cross-sectional dimensions of the first nanowires in the first layer are relatively larger than cross-sectional dimensions of the second nanowires in the second layer.

5. The optical device of claim 1 wherein the first layer of nanowires, the second layer of nanowires, and the phase-modulation layer further comprise a negative index material crossbar for the wavelength.

6. The optical device of claim 1 wherein the one or more regions further comprise concentric regions that focus electromagnetic radiation with the wavelength to a focal point.

7. The optical device of claim 1 wherein the one or more regions further comprise the one or more regions electronically addressed such that electromagnetic radiation with the wavelength diverges from a focal point.

8. The optical device of claim 1 wherein the phase-modulation layer further comprises one of:
   a resistor;
   a semiconductor p-n junction; or
   a nonvolatile memristor.

9. A method for focusing or diverging electromagnetic radiation having a wavelength, the method comprising:
   determining an effective refractive index pattern of one or more regions of an optical device to focus or diverge an incident beam of electromagnetic radiation having the wavelength;
   selectively applying a first set of electronic signals to first nanowires in the first layer of nanowires of the optical device;
   selectively applying a second set of electronic signals to second nanowires in the second layer of nanowires of the optical device, the electronic signals to change the effective refractive indices of regions of the optical device in accordance with the pattern of regions; and
   transmitting the beam of the electromagnetic radiation having the wavelength into the optical device.

10. The method of claim 9 further comprising changing the effective refractive index of the pattern of regions to adjust the focal length of the optical element.

11. The method of claim 9 further comprising changing the effective refractive index of the pattern of regions from focusing to diverging the incident beam or from diverging to focusing the incident beam.

12. The method of claim 9 further comprising changing the effective refractive index of the pattern of regions from focusing or diverging the incident beam to bending the incident beam or from bending the incident beam to diverging or focusing the incident beam.

13. The method of claim 9 wherein determining the effective refractive index pattern of the regions further comprises determining the effective refractive index pattern of annular regions of the optical device.

14. The method of claim 9 wherein selectively applying the first and second sets of electronic signals to the first and second nanowires further comprises changing the effective refractive index of the pattern of regions from positive to negative for the wavelength.

15. A system for refracting a beam of electromagnetic radiation having a wavelength, the system comprising:
   a computing device including a processor and a memory;
   a dynamically reconfigurable optical device in communication with the computing device; and
   an electromagnetic radiation source positioned and configured to emit quasimonochromatic electromagnetic radiation with a wavelength into the optical device, wherein the processor is to determine an effective refractive index pattern of regions of the optical device to focus or diverge the beam, selectively apply a first set of electronic signals to nanowires in a first layer of nanowires of the optical device, and selectively apply a second set of electronic signals to nanowires in a second layer of nanowires of the optical device to change the effective refractive indices of regions of the optical device in accordance with the pattern of regions, wherein the regions in the effective refractive index pattern are annular regions.

* * * * *